US012759385B2

(12) United States Patent
Zhang et al.

(10) Patent No.: US 12,759,385 B2

(45) Date of Patent: Oct. 13, 2026

(54) BATTERY PACK FOR ELECTRIC VEHICLE AND ELECTRIC VEHICLE COMPRISING BATTERY PACK

(71) Applicants: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

(72) Inventors: Jianping Zhang, Shanghai (CN); Danliang Qiu, Shanghai (CN); Meng Liu, Shanghai (CN); Xinrui Yu, Shanghai (CN)

(73) Assignees: AULTON NEW ENERGY AUTOMOBILE TECHNOLOGY CO., LTD., Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 328 days.

(21) Appl. No.: 18/572,797

(22) PCT Filed: Nov. 30, 2022

(86) PCT No.: PCT/CN2022/135659

§ 371 (c)(1),
(2) Date: Dec. 21, 2023

(87) PCT Pub. No.: WO2023/098762

PCT Pub. Date: Jun. 8, 2023

(65) Prior Publication Data

US 2024/0286478 A1 Aug. 29, 2024

(30) Foreign Application Priority Data

Nov. 30, 2021 (CN) ......................... 202111444383.8
Dec. 26, 2021 (CN) ......................... 202111606763.7
(Continued)

(51) Int. Cl.
*B60K 1/04* (2019.01)
*B60L 50/64* (2019.01)
(Continued)

(52) U.S. Cl.
CPC ................ *B60K 1/04* (2013.01); *B60L 50/64* (2019.02); *B60L 53/80* (2019.02);
(Continued)

(58) Field of Classification Search
CPC .... B60K 2001/0405; B60K 2001/0438; B60K 2001/0455; B60K 2001/0472; B60K 1/04;
(Continued)

(56) References Cited

U.S. PATENT DOCUMENTS

2020/0259143 A1 8/2020 Sloan et al.
2021/0380001 A1* 12/2021 Hörder .............. H01M 10/6568
2023/0173904 A1* 6/2023 Ragot ................ H01M 50/244 180/68.5

FOREIGN PATENT DOCUMENTS

CN 102529666 A 7/2012
CN 212765666 U 3/2021
(Continued)

OTHER PUBLICATIONS

Apr. 27, 2025 First Search Report issued in Chinese Patent Application No. 202111673216.0.
(Continued)

*Primary Examiner* — Lori Wu

(57) ABSTRACT

Disclosed in the present invention are a battery pack for an electric vehicle, and an electric vehicle comprising the
(Continued)

battery pack. The battery pack for an electric vehicle is mounted on a vehicle body longitudinal beam of the electric vehicle, and comprises: a box body comprising at least two box body units, battery modules for externally charging and discharging being arranged in the box body units; and locking shafts provided horizontally, arranged on the upper part between two adjacent box body units, and corresponding to the position of a locking mechanism on the longitudinal beam. As for an electric vehicle, the center of gravity can be reduced, the driving stability is improved, and the height space below the vehicle can be fully utilized, so that a battery swapping device can conduct battery swapping easily, the station building cost, time and difficulty of a battery swapping station are reduced.

20 Claims, 16 Drawing Sheets

(30) Foreign Application Priority Data

Dec. 26, 2021 (CN) ........................ 202111606781.5
Dec. 31, 2021 (CN) ........................ 202111673216.0

(51) Int. Cl.

| | |
|---|---|
| ***B60L 53/80*** | (2019.01) |
| ***H01M 50/204*** | (2021.01) |
| ***H01M 50/209*** | (2021.01) |
| ***H01M 50/244*** | (2021.01) |
| ***H01M 50/249*** | (2021.01) |
| ***H01M 50/262*** | (2021.01) |
| ***H01M 50/264*** | (2021.01) |
| ***H01M 50/289*** | (2021.01) |
| *H01M 50/242* | (2021.01) |

(52) U.S. Cl.

CPC ....... *H01M 50/204* (2021.01); *H01M 50/209* (2021.01); *H01M 50/244* (2021.01); *H01M 50/249* (2021.01); *H01M 50/262* (2021.01); *H01M 50/264* (2021.01); *H01M 50/289* (2021.01); *B60K 2001/0405* (2013.01); *B60K 2001/0438* (2013.01); *B60K 2001/0455* (2013.01); *B60K 2001/0472* (2013.01); *H01M 50/242* (2021.01); *H01M 2220/20* (2013.01)

(58) Field of Classification Search

CPC .. H01M 10/46; H01M 50/204; H01M 50/209; H01M 50/244; H01M 50/249; H01M 50/262; H01M 50/264; H01M 50/271; H01M 50/289; H01M 50/242; H01M 50/20; H01M 2220/20; B60L 50/64; B60L 50/66; B60L 53/80; B60L 2200/36

See application file for complete search history.

(56) References Cited

FOREIGN PATENT DOCUMENTS

| | | | |
|---|---|---|---|
| CN | 112744064 | A | 5/2021 |
| CN | 112805175 | A | 5/2021 |
| CN | 213705138 | U | 7/2021 |
| CN | 113696707 | A | 11/2021 |
| CN | 217835333 | U | 11/2022 |
| JP | 2014024509 | A | 2/2014 |

OTHER PUBLICATIONS

Apr. 29, 2025 First Office Action issued in Chinese Patent Application No. 202111673216.0.

Feb. 20, 2023 International Search Report issued in International Patent Application No. PCT/CN2022/135659.

Feb. 20, 2023 Written Opinion of the International Searching Authority issued in International Patent Application No. PCT/CN2022/135659.

* cited by examiner

BATTERY PACK FOR ELECTRIC VEHICLE AND ELECTRIC VEHICLE COMPRISING BATTERY PACK

The present application claims the priority of Chinese patent application CN2021116732160 with the filing date of Dec. 31, 2021, the priority of Chinese patent application CN2021116067637 with the filing date of Dec. 26, 2021, Chinese patent application CN2021116067815 with the filing date of Dec. 26, 2021, and Chinese patent application CN2021114443838 with the filing date of Nov. 30, 2021. The contents of the Chinese patent applications are incorporated herein by reference in their entireties.

TECHNICAL FIELD

The present disclosure relates to the technical field of battery swapping for vehicles, in particular to a battery pack for an electric vehicle and an electric vehicle comprising the battery pack.

BACKGROUND

In recent years, new energy vehicles have developed rapidly, and electric vehicles relying on batteries as driving energy have the advantages of zero emission and low noise. With the increasing market share and frequency of use of electric vehicles, the current electric commercial vehicles of electric vehicles, such as electric heavy trucks and electric light trucks, have also gradually appeared in their respective application scenarios, and at the same time, a battery swapping station for battery pack swapping of electric trucks has also been built to replace the battery pack.

In the prior art, the battery pack is heavy, resulting in a relatively thick overall thickness of the battery pack, and it is installed above the longitudinal beam of the electric vehicle body, which leads to a high center of gravity of the electric vehicle and poor stability during driving. If the battery pack of the electric vehicle needs to be swapped, the battery swapping station requires a large site and a hoisting tool for hoisting the battery pack, so as to hoist the battery pack to the battery swapping position, which leads to great difficulty in battery swapping and the high construction cost of the battery swapping station.

CONTENT OF THE PRESENT INVENTION

The technical problem to be solved by the present disclosure is to provide a battery pack for an electric vehicle and an electric vehicle comprising battery pack in order to overcome the defects in the prior art that the battery is installed above the longitudinal beam of the electric vehicle body, which leads to a high center of gravity of the electric vehicle and poor stability during driving, and at the same time the battery swapping station requires a large site and a hoisting tool, which leads to great difficulty in battery swapping and high construction costs.

The present disclosure solves the above technical problems by means of the following technical solutions:

a battery pack for an electric vehicle, which is installed on a vehicle body longitudinal beam of the electric vehicle, wherein the battery pack for the electric vehicle comprises: a box, the box including at least two box units, and the box unit being provided with a battery module for external charging and discharging; a locking shaft arranged horizontally, the locking shaft being provided on upper part between two adjacent box units and corresponding to the location of a locking mechanism on the vehicle body longitudinal beam.

The battery pack for the electric vehicle is provided below the vehicle body longitudinal beam by means of the locking shaft, so that the center of gravity of the electric vehicle can be lowered, the driving stability of the electric vehicle can be improved, and the battery pack may not occupy a large space behind the driver, which improves the driving experience of the driver, and more goods can be carried above the longitudinal beam. At the same time, since the battery pack may be installed from below the vehicle body longitudinal beam, and the battery pack for the electric vehicle has a relatively thin thickness, a height space below the vehicle body longitudinal beam can be fully utilized, so that a battery swapping device may swap a battery from the bottom of the electric vehicle, and it is not necessary to set a sunken space or digging a pit for the battery swapping device to enter and exit, or lift the electric vehicle to create enough height space for the battery swapping device, thereby reducing the cost, time and difficulty of building a battery swapping station, and reducing the requirements for a site for building the station, and improving the efficiency of battery swapping.

Preferably, a mounting plate is provided on the box, and one end of the locking shaft is connected to the mounting plate.

Preferably, both ends of the locking shaft are connected to the mounting plate.

With the above structure arrangement, the both ends of the locking shaft are fixed ends, so the locking shaft may transmit the force it receives to the mounting plate on both sides, so that the force at the locking shaft is more uniform, and the connection between the locking shaft and the locking mechanism is more firm.

Preferably, the mounting plate is at least partially provided between two adjacent box units.

With the above structure arrangement, the mounting plate is arranged between two box units to avoid occupying an upper space of the box units, and at the same time at least part of the mounting plate is arranged between the two box units, so that the two box units can be connected simultaneously, so that the force of the locking shaft during locking can act on the two box units at the same time, the force is more dispersed, and stress concentration is avoided.

Preferably, the mounting plate extends along a longitudinal direction of the vehicle body longitudinal beam.

With the above structure arrangement, the connection of the locking shaft relative to the box is more reliable by setting the mounting plate to connect the locking shaft.

Preferably, there are a plurality of locking shafts, and the plurality of locking shafts are sequentially distributed on an end surface of the mounting plate close to the locking mechanism along the longitudinal direction of the vehicle body longitudinal beam.

With the above structure arrangement, the plurality of locking shafts are distributed on the mounting plate, so that a connection can be realized through multipoint contact when the battery pack for the electric vehicle is connected with the vehicle body longitudinal beam, and the force exerted on the locking shafts is evenly distributed on the mounting plate, so that the connection between the locking shafts and the mounting plate is further prevented from being broken due to excessive force, and the locking reliability of the battery pack relative to the electric vehicle is improved.

Preferably, the battery pack for the electric vehicle further includes a guide block, the guide block is elastically arranged on an end surface of the mounting plate close to the vehicle body longitudinal beam, and the guide block has a clamping surface for abutting against a side surface of the vehicle body longitudinal beam.

With the above structure arrangement, after the battery pack for the electric vehicle is mounted on the vehicle body longitudinal beam, the positioning ability of the battery pack for the electric vehicle relative to a vehicle body bracket of the electric vehicle can be improved, and shaking can be avoided when the battery pack for the electric vehicle is locked on the electric vehicle.

Preferably, one end of the guide block away from the box is obliquely provided with a guide surface, and the guide surface gradually approaches the mounting plate from bottom to top along a height direction of the battery pack for the electric vehicle.

With the above structure arrangement, during the installation of the battery pack on the vehicle body longitudinal beam, the position of the vehicle body longitudinal beam is adjusted in the horizontal direction with the guidance of the guide surface, thus enabling more precise positioning of the locking shaft and the locking mechanism.

Preferably, the locking shaft and the guide block are arranged on the mounting plate at intervals along the horizontal direction.

With the above structure arrangement, the locking shaft and the guide block are arranged at intervals, which can avoid the interference between the locking mechanism and the guide block during the locking process of the locking shaft and the locking mechanism.

Preferably, each of the box units comprises: a box body, the box body being provided with a battery cell accommodating groove for placing a battery module; a box cover plate, the box cover plate being detachably connected to a notch of the battery cell accommodating groove of the box body and closing the notch.

With the above structure arrangement, in the case of meeting the requirements of the box to accommodate the battery module, the box cover plate arranged on the top of the box may not affect the arrangement of the locking shaft, and at the same time the box cover plate can facilitate the assembly and disassembly of the battery module in the battery cell accommodating groove.

Preferably, there is a gap between the adjacent box units, and the box further includes: a gap connection structure, the adjacent box units are connected by the gap connection structure, and the gap connection structure is respectively connected to the box bodies of the adjacent box units; the mounting plate is provided on the gap connection structure.

With the above structure arrangement, a gap is designed between adjacent box units through the gap connection structure, and the mounting plate is connected to the gap connection structure, so that the force received by the locking shaft can be transmitted to the adjacent box units through the mounting plate and the gap connection structure in turn, making the force on the battery pack for the electric vehicle more evenly dispersed. A reinforcement beam is accommodated, so that the locking shaft is more firmly connected to the box through the reinforcement beam, and at the same time, the adjacent box units can be connected into a whole through the gap connection structure.

Preferably, the battery pack for the electric vehicle further comprises a reinforcement beam, a first end of the reinforcement beam extends above the box and is connected to the mounting plate, and a second end of the reinforcement beam is connected to the gap connection structure.

With the above structure arrangement, the setting position of the reinforcement beam makes full use of the space in the gap, so as to avoid the reduction of the area for accommodating the battery module in the box due to the setting of the reinforcement beam, and at the same time, the reinforcement beam can improve the connection strength between the locking shaft and the gap connection structure, so as to avoid the structural damage of the battery pack for the electric vehicle due to excessive stress at the locking shaft.

Preferably, the gap connection structure includes an upper plate and a lower plate, two ends of the lower plate are respectively connected to bottoms of the box bodies of the adjacent box units, and two ends of the upper plate are respectively connected to tops of the box bodies of the adjacent box units;

the second end of the reinforcement beam passes through the upper plate and is connected to the lower plate.

With the above structure arrangement, by setting the upper plate and the lower plate to limit the reinforcement beam in the horizontal direction, the purpose of improving the structural strength of the reinforcement beam is realized, so as to improve the stability of the connection of the battery pack for the electric vehicle relative to the vehicle body longitudinal beam.

Preferably, an upper end of the mounting plate is provided with a first extending portion, and the first extending portion wraps the first end of the reinforcement beam;

and/or, a lower end of the mounting plate is provided with a second extending portion, and the second extending portion abuts against the upper plate.

With the above structure arrangement, the first end of the reinforcement beam is wrapped by the first extending portion, so that the connection between the mounting plate and the reinforcement beam is stronger, and the second extending portion abutting against the upper plate can further strengthen the connection strength between the mounting plate and the reinforcement beam.

Preferably, the lower plate comprises a first side plate, a top plate and a second side plate which are sequentially connected, the lower plate is connected with the box body of the box unit on a corresponding side through the first side plate and the second side plate, and the second end of the reinforcement beam is connected with the top plate;

an end surface of the top plate is provided with a vertical rib.

With the above structure arrangement, the strength at the top plate is strengthened by providing the vertical rib at the top plate.

Preferably, there are a plurality of reinforcement beams, and the plurality of reinforcement beams are arranged along the longitudinal direction of the longitudinal beam of the vehicle body.

With the above structure arrangement, by arranging the plurality of reinforcement beams, the number of connection points between the reinforcement beams and the mounting plates, is increased, so that the force on the mounting plate can be to be transmitted to the adjacent box units more evenly, making the force on the battery pack for the electric vehicle more even.

Preferably, the box unit further comprises a sealing member, and the sealing member is annularly arranged at the notch of the battery cell accommodating groove and sandwiched between the box body and the box cover plate.

The above structural arrangement improves the sealing effect inside the box unit and prevents external environmental factors from affecting the normal operation of the battery module inside the box unit.

Preferably, the sealing member is a foamed silicone pad.

With the above structure arrangement, the foamed silicone pad has excellent electrical properties and chemical stability, and is water-resistant, so it can have a good sealing effect when used here.

Preferably, a surface of the box cover plate has a reinforcement structure.

With the above structure arrangement, the structure arrangement can improve the structural strength of the cover plate and avoid deformation when installed on the box body, resulting in poor sealing performance.

Preferably, the reinforcement structure comprises a protruding portion of the box cover plate protruding in a direction away from the box body and a reinforcement rib, and the protruding portion forms a reinforcement groove with an opening facing the direction of the box body, and the reinforcement rib is arranged in the reinforcement groove.

The above structural arrangement improves the structural strength of the box cover plate and avoids concave deformation during long-term use.

Preferably, the reinforcement groove extends along the longitudinal direction of the vehicle body longitudinal beam;

there are a plurality of reinforcement ribs, and the plurality of reinforcement ribs are arranged in the reinforcement groove along the longitudinal direction of the vehicle body longitudinal beam.

Preferably, the battery pack for the electric vehicle further comprises a second electrical connector for docking with a first electrical connector on the vehicle body longitudinal beam, the second electrical connector is arranged at a position of the box corresponding to the first electrical connector, and the second electrical connector is electrically connected with the battery module.

With the above structure arrangement, each battery module is electrically connected to the second electrical connector through a cable, thus connecting to the first electrical connector that needs power supply externally through the second electrical connector to improve operation safety.

Preferably, the box further comprises:

a cable duct, through which the battery cell accommodating grooves of the adjacent box units are connected.

The above structural arrangement enables cables of the battery modules in different box units to be collected in the same box unit through the cable duct, so as to facilitate cable wiring and avoid cable exposure.

Preferably, the cable duct is provided close to the second electrical connector.

With the above structural arrangement, the routing length of the cable can be reduced, thus reducing the purchase cost of the cable.

Preferably, the battery pack for the electric vehicle further includes a side reinforcement structure, the side reinforcement structure is arranged around outside of the box, and the side reinforcement structure is respectively connected to an outer surface of each box body.

With the above structure arrangement, the connection between the box bodies is further strengthened by setting the side reinforcement structure.

Preferably, the side reinforcing structure is provided with a weight-reducing hole.

With the above structure arrangement, the purpose of reducing the weight of the side reinforcement structure is realized, thus further reducing the production cost of the battery pack for the electric vehicle.

Preferably, the battery pack for the electric vehicle also includes a bottom reinforcement structure, the bottom reinforcement structure is fixed on an inner bottom surface of the box body, two ends of the bottom reinforcement structure extend to an inner wall of the box body respectively.

By setting the bottom reinforcement structure, the bottom strength of the box body is strengthened, and the bottom of the box body is prevented from being deformed by force due to the weight of the battery module.

Preferably, there are a plurality of bottom reinforcement structures, and the plurality of bottom reinforcement structures are arranged in the box body in parallel at intervals, and the battery module is carried and arranged on the plurality of bottom reinforcement structures simultaneously.

The bottom reinforcement structure at the bottom of the box body is used for carrying the battery module, so that the weight of the battery module can be dispersed in the box body and the force is evenly applied.

Preferably, there are a plurality of the locking shafts which are divided into two groups along a width direction of the vehicle body longitudinal beam, and the two groups of the locking shafts are symmetrically distributed on the box, and the box comprises three box units, the three box units are distributed at intervals, and two of the three box units are located outside the two groups of symmetrically arranged locking shafts, and the other box unit is arranged between the two groups of symmetrically arranged locking shafts.

By providing two groups of locking shafts symmetrically arranged on the upper surface of the box, the locking shafts lock with the locking mechanism on the vehicle body longitudinal beam of the electric vehicle from different directions to further improve the locking effect.

An electric vehicle comprises a longitudinal beam of a vehicle body and the battery pack for the electric vehicle as described above, wherein a locking mechanism is arranged on the vehicle body longitudinal beam, and the battery pack for the electric vehicle is detachably connected to the vehicle body longitudinal beam through a cooperation of the locking shaft and the locking mechanism.

The battery pack for the electric vehicle is provided below the vehicle body longitudinal beam by means of the locking shaft, so that the center of gravity of the electric vehicle can be lowered, the driving stability of the electric truck can be improved, and the battery pack may not occupy a large space behind the driver, which improves the driving experience of the driver, and more goods can be carried above the longitudinal beam. At the same time, since the battery pack may be installed from below the vehicle body longitudinal beam, and the battery pack for the electric vehicle has a relatively thin thickness, a height space below the vehicle body longitudinal beam can be fully utilized, so that a battery swapping device may swap a battery from the bottom of the electric vehicle, and it is not necessary to set a sunken space or digging a pit for the battery swapping device to enter and exit, or lift the electric vehicle to create enough height space for the battery swapping device, thereby reducing the cost, time and difficulty of building a battery swapping station, and reducing the requirements for a site for building the station, and improving the efficiency of battery swapping.

Preferably, the electric vehicle further comprises a vehicle body bracket, the locking mechanism is provided on the vehicle body bracket, the vehicle body bracket is provided on the vehicle body longitudinal beam.

The battery pack is connected to the vehicle body bracket on the longitudinal beam of the electric vehicle, the connection reliability is higher, and the modification of the vehicle body longitudinal beam is reduced.

Preferably, a height of a connection point between the locking mechanism and the locking shaft is higher than a height of a lower end of the vehicle body bracket or the vehicle body longitudinal beam.

The above structural arrangement increases the height of the battery pack installed on the vehicle body longitudinal beam, and provides more space in the height direction for the battery swapping device.

Preferably, the battery pack for the electric vehicle has a plurality of locking shafts, the locking shafts are symmetrically distributed on the box, and free ends of the locking shafts are oppositely arranged, and the locking mechanism is arranged on a back side of the vehicle body bracket;

or, the battery pack for the electric vehicle has a plurality of locking shafts, the locking shafts are symmetrically distributed on the box, and the free ends of the locking shafts are arranged back to back, and the locking mechanism is arranged on an opposite side of the vehicle body bracket.

With the above structure arrangement, the locking function is realized from different directions by the locking shaft and the locking mechanism, thus improving the reliability and stability of the battery pack mounted on the vehicle body bracket.

The positive progressive effect of the present disclosure is that:

for the battery pack and the electric vehicle comprising battery pack, the battery pack is provided below the vehicle body longitudinal beam by means of the locking shaft, so that the center of gravity of the electric vehicle can be lowered, the driving stability of the electric truck can be improved, and the battery pack may not occupy a large space behind the driver, which improves the driving experience of the driver, and more goods can be carried above the longitudinal beam. At the same time, since the battery pack may be installed from below the vehicle body longitudinal beam, and the battery pack for the electric vehicle has a relatively thin thickness, a height space below the vehicle body longitudinal beam can be fully utilized, so that a battery swapping device may swap a battery from the bottom of the electric vehicle, and it is not necessary to set a sunken space or digging a pit for the battery swapping device to enter and exit, or lift the electric vehicle to create enough height space for the battery swapping device, thereby reducing the cost, time and difficulty of building a battery swapping station, and reducing the requirements for a site for building the station, and improving the efficiency of battery swapping.

Figure 1:
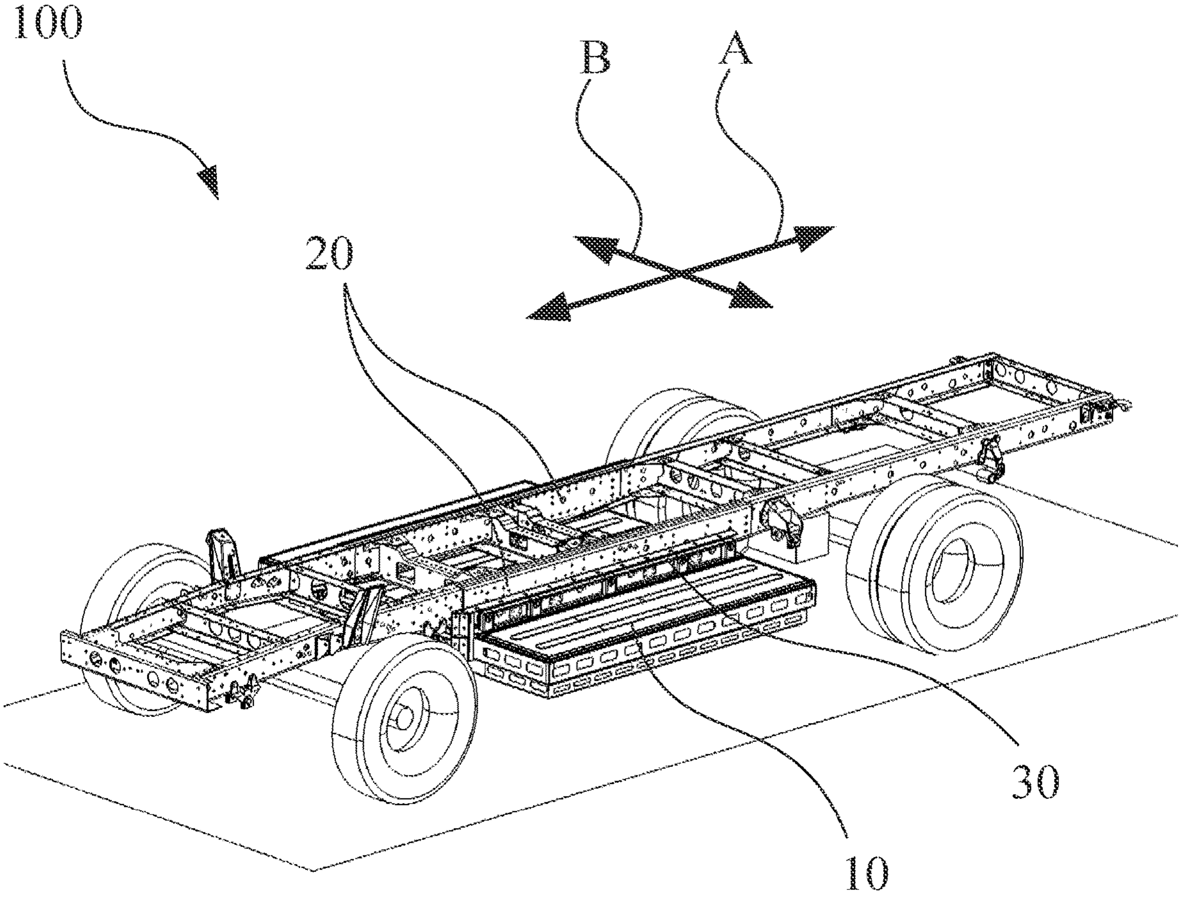
FIG. 1 is a schematic structural view of a chassis of an electric vehicle according to Embodiment 1 of the present disclosure.

Explanation of reference numerals: electric vehicle 100; battery pack 10; box 1; box unit 11; box body 111, battery cell accommodating groove 1111, notch 1112; box cover plate 112, protruding portion 1121, reinforcement rib 1122; sealing member 113; cable duct 114; side reinforcement structure 115; bottom reinforcement structure 116; gap connection structure 2; upper plate 21; lower plate 22; first side plate 221, top plate 222, second side plate 223; vertical rib 23; locking shaft 3; mounting plate 4; first extending portion 41; second extending portion 42; guide block 5, clamping surface 51, guide surface 52; second electrical connector 6; reinforcement beam 7; vehicle body longitudinal beam 20; vehicle body bracket 30; locking mechanism 40; first electrical connector 50; battery module 60; longitudinal direction A of vehicle body longitudinal beam; width direction B of vehicle body longitudinal beam.

DETAILED DESCRIPTION OF THE PREFERRED EMBODIMENT

The present disclosure is further illustrated below by means of embodiments, but the present disclosure is not limited to the scope of the embodiments.

The present disclosure provides an electric vehicle 100, the structure of a chassis of which is shown in FIG. 1. The electric vehicle 100 has two vehicle body longitudinal beams 20 arranged in parallel along the front and rear direction, which are used for connecting main components of the electric vehicle 100, such as suspension, wheels, etc., and a battery pack for the electric vehicle is also installed below the two vehicle body longitudinal beams 20, thereby lowering the center of gravity of the electric vehicle and making the electric vehicle run more smoothly. In this embodiment, the electric vehicle is a heavy truck or a light truck. It is certain that the electric vehicle may also be a passenger vehicle, which will not be repeated here.

Figure 2:
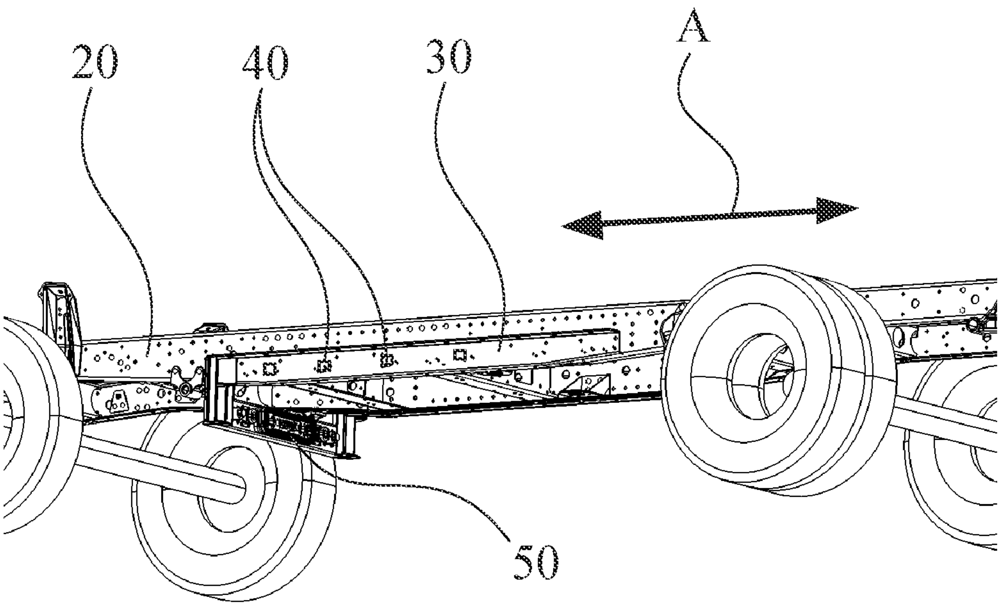
FIG. 2 is a schematic view of a partial structure of the chassis of the electric vehicle according to Embodiment 1 of the present disclosure.
Figure 3:
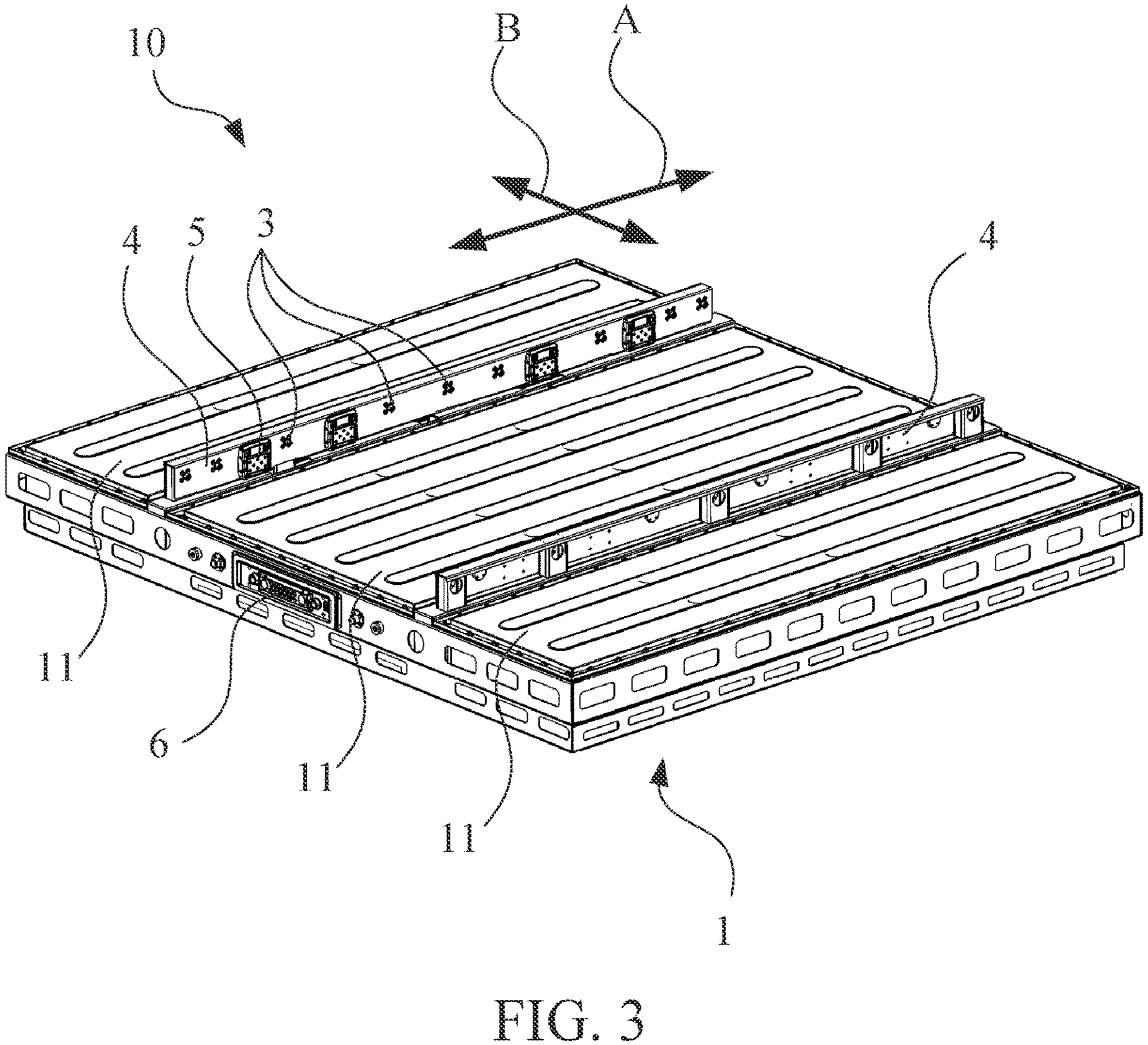
FIG. 3 is a schematic structural view of a battery pack according to Embodiment 1 of the present disclosure.

As shown in FIG. 2 and FIG. 3, in this embodiment, the two vehicle body longitudinal beams 20 of the electric vehicle 100 are simultaneously connected with a vehicle body bracket 30, and the vehicle body bracket 30 is in a frame structure formed by welding plates. Each locking mechanism 40 is arranged on the vehicle body bracket 30 for locking connection with a locking shaft 3 on a battery pack 10, so that the battery pack 10 can be connected to or disconnected from the vehicle body bracket 30, thereby achieving the purpose of swapping a battery. Herein, the locking mechanisms 40 are arranged in two rows on the vehicle body bracket 30 to correspond to the two vehicle body longitudinal beams 20 respectively, and these locking mechanisms 40 are arranged in sequence along a longitudinal direction A of the vehicle body longitudinal beam to improve the reliability and stability of the connection of the battery pack 10 relative to the vehicle body bracket 30 by means of multiple-point connection.

Herein, it can be seen from FIG. 2 that, specifically, the locking mechanism 40 is arranged on an end surface of the vehicle body bracket 30 away from the vehicle body longitudinal beam 20, and is higher than a lower end of the vehicle body bracket 30, so that a height of the connection point of the locking mechanism relative to the locking shaft can be higher than a height of the lower end of the vehicle body bracket 30, so as to increase the height of the battery pack 10 installed on the electric vehicle 100 as much as possible. The battery pack 10 is arranged below the vehicle body bracket 30, so that a battery swapping device (not shown in the figure) can install the battery pack 10 from below, and lock or unlock the battery pack 10 relative to the locking mechanism 40 of the vehicle body bracket 30, and the battery pack 10 can be taken, placed and transported, so that a height space below the vehicle body longitudinal beam can be fully utilized, and the battery swapping device can conduct the battery swapping from the bottom of the electric vehicle.

Moreover, there are a plurality of locking mechanisms 40 evenly distributed on the side of the vehicle body bracket 30, and there are also a plurality of corresponding locking shafts 3, which are in one-to-one correspondence. It can be seen from FIG. 3 that the locking shafts 3 located on the battery pack 10 in this embodiment are symmetrically distributed on the box, and free ends of the locking shafts 3 distributed on both sides are oppositely arranged, that is, the free ends extend in the opposite directions close to each other to cooperate with the locking mechanism 40 arranged on a back side of the vehicle body bracket 30. It is certain that in other embodiments, the free ends of the symmetrically distributed locking shafts 3 may also be arranged back to back, so that the corresponding locking mechanism 40 is arranged on the opposite side of the vehicle body bracket 30. By adding the number of the locking shafts 3 and the locking mechanisms 40, the reliability and stability of the connection of the battery pack 10 relative to the vehicle body bracket 30 is improved.

At the same time, as shown in FIG. 2, at the end position of the vehicle body bracket 30, a first electrical connector 50 is also provided for docking with a second electrical connector 6 on the side of the battery pack 10, so as to realize the electrical connection with the battery pack 10 when the battery pack 10 is mounted on the vehicle body bracket 30 and meet the demand of power supply to the electric vehicle 100.

Figure 4:
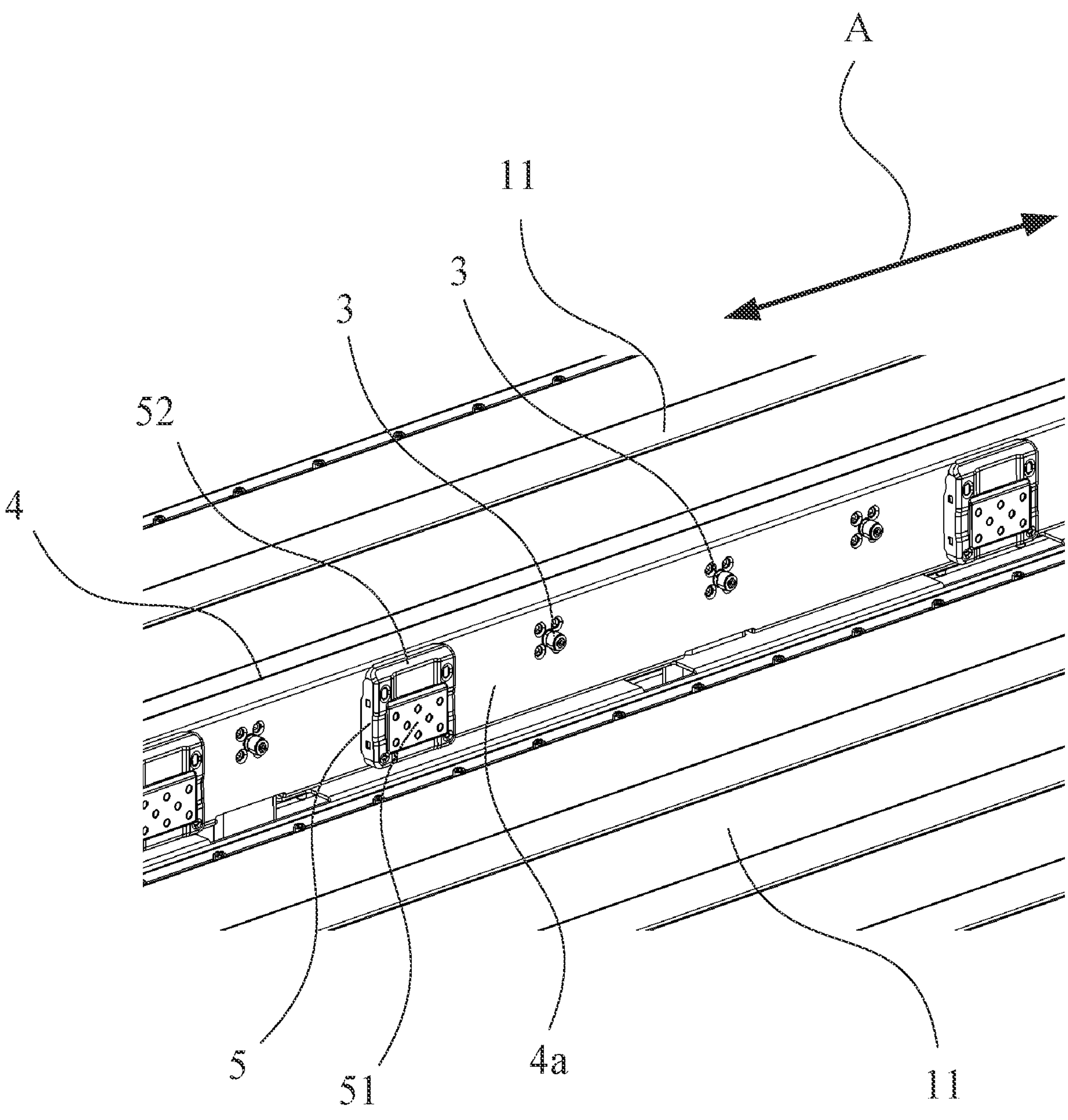
FIG. 4 is a schematic view of a partial structure of the battery pack according to Embodiment 1 of the present disclosure.

The specific structure of the battery pack 10 is shown in FIG. 4, including a box 1 and a horizontally arranged locking shaft 3, wherein the box 1 includes three box units 11, and two gaps are formed between the three box units 11, and the box units 11 is provided with a battery module 60 for external charging and discharging. Along a width direction B of the vehicle body longitudinal beam, the locking shafts 31 are multiple and divided into two groups, and the two groups of locking shafts 31 are symmetrically distributed on the box 1. Specifically, multiple locking shafts 3 of each group of the locking shafts 3 are arranged in two rows above the gap at the corresponding position and are arranged at a corresponding position of the locking mechanism 40 on the vehicle body bracket 30.

Figure 5:
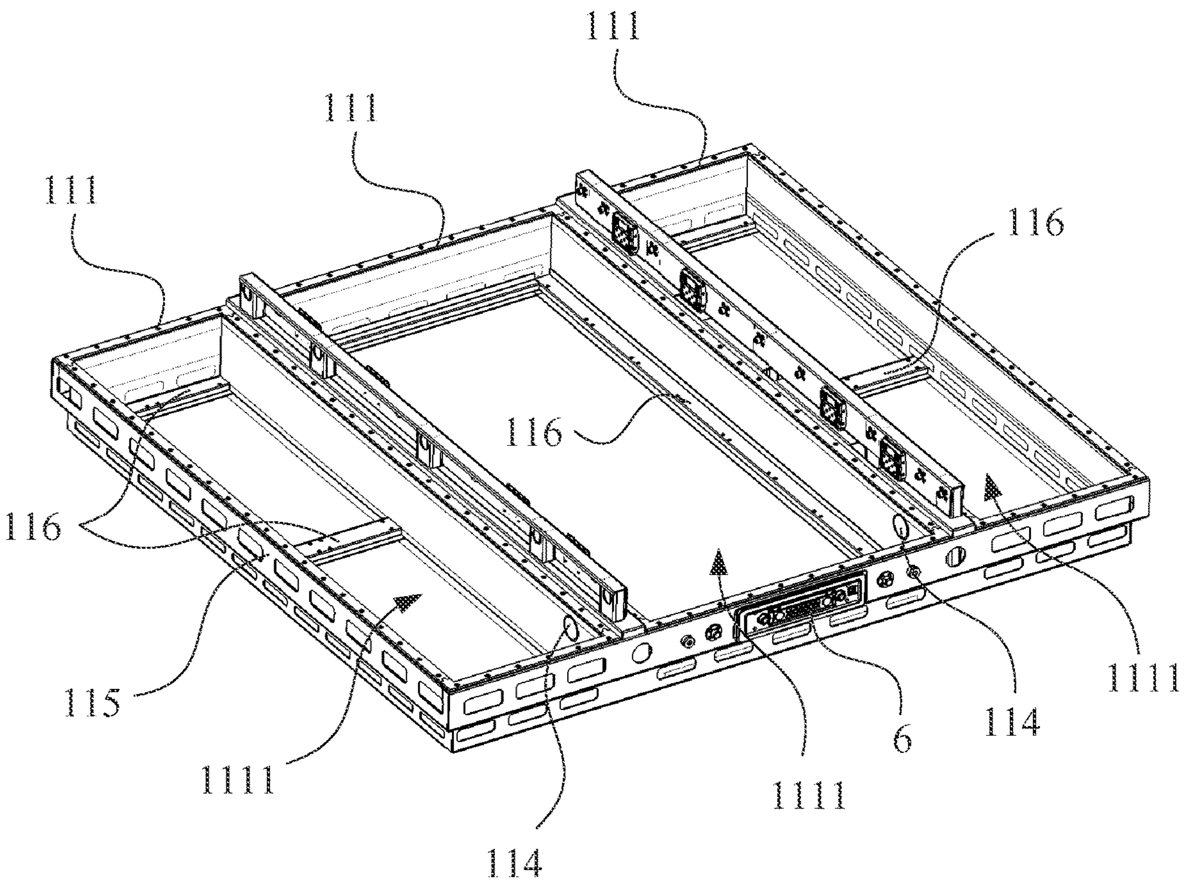
FIG. 5 is a schematic structural view of the battery pack according to Embodiment 1 of the present disclosure, in which a box cover plate is hidden.
Figure 6:
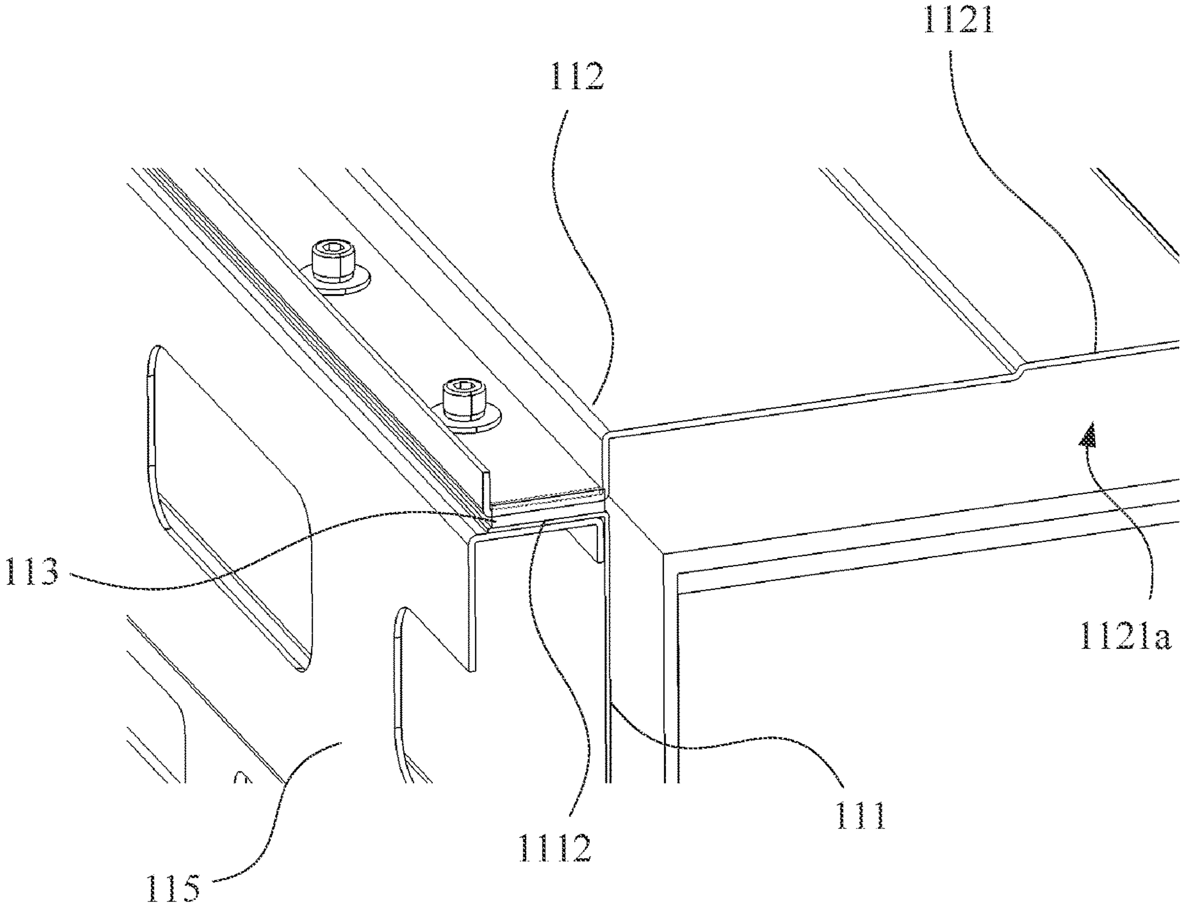
FIG. 6 is a partial cross-sectional view of a connection between a box body and the box cover plate according to Embodiment 1 of the present disclosure.

Specifically, as shown in FIGS. 5 and 6, each box unit 11 includes a box body 111, a box cover plate 112 and a sealing member 113. Herein, an upper part of the box body 111 is open, and a battery cell accommodating groove 1111 is formed inside, and the battery module 60 is placed in the battery cell accommodating groove 1111. The box cover plate 112 covers the position of a notch 1112 of the battery cell accommodating groove 1111, and covers and closes the whole notch 1112. The sealing member 113 is cushioned between the box body 111 and the box cover plate 112, so as to realize the sealing of the battery cell accommodating groove 1111.

In this embodiment, the sealing member 113 is a foamed silicone pad. The foamed silicone pad has excellent electrical properties and chemical stability, and water resistance, and can have a good sealing effect when used to close the box 1.

In addition, as shown in FIG. 6, the box cover plate 112 in this embodiment is connected to the box body 111 by a bolt to achieve a detachable connection, and the bolt also penetrates the sealing member 113, so that the reaction force generated by the sealing member 113 in the process of being pressed can act on the bolt, providing a pressing force for bolt fixation, improving the reliability of sealed connection and avoiding the bolt from loosening in the long-term use process.

In addition, the battery pack 10 also includes two mounting plates 4 and two gap connection structures 2 located in the above two gaps. Adjacent box units 11 are connected through the gap connection structures 2, and the gap connection structures 2 are respectively connected to the box bodies 111 of the adjacent box units 11.

The two mounting plates 4 are arranged on the box 1 through the gap connection structure 2. Specifically, the two mounting plates 4 are arranged between adjacent box units 11 along a longitudinal direction A of the vehicle body longitudinal beam. Specifically, the mounting plates 4 are located above the gaps between adjacent box units 11, that is, one mounting plate 4 is arranged above each gap. One end of the plurality of locking shafts 3 is sequentially arranged on the end surfaces of the mounting plates 4 close to the locking mechanism 40 along the longitudinal direction A of the vehicle body longitudinal beam.

Specifically, the gap connection structure 2 in this embodiment comprises an upper plate 21 and a lower plate 22, wherein left and right ends of the lower plate 22 are respectively connected with bottoms of the box bodies 111 of the adjacent box units 11, and two ends of the upper plate 21 are respectively connected with tops of the box bodies 111 of the adjacent box units 11. The gap connection structure 2 limits a reinforcement beam 7 in the horizontal direction through the upper plate 21 and the lower plate 22.

Figure 9:
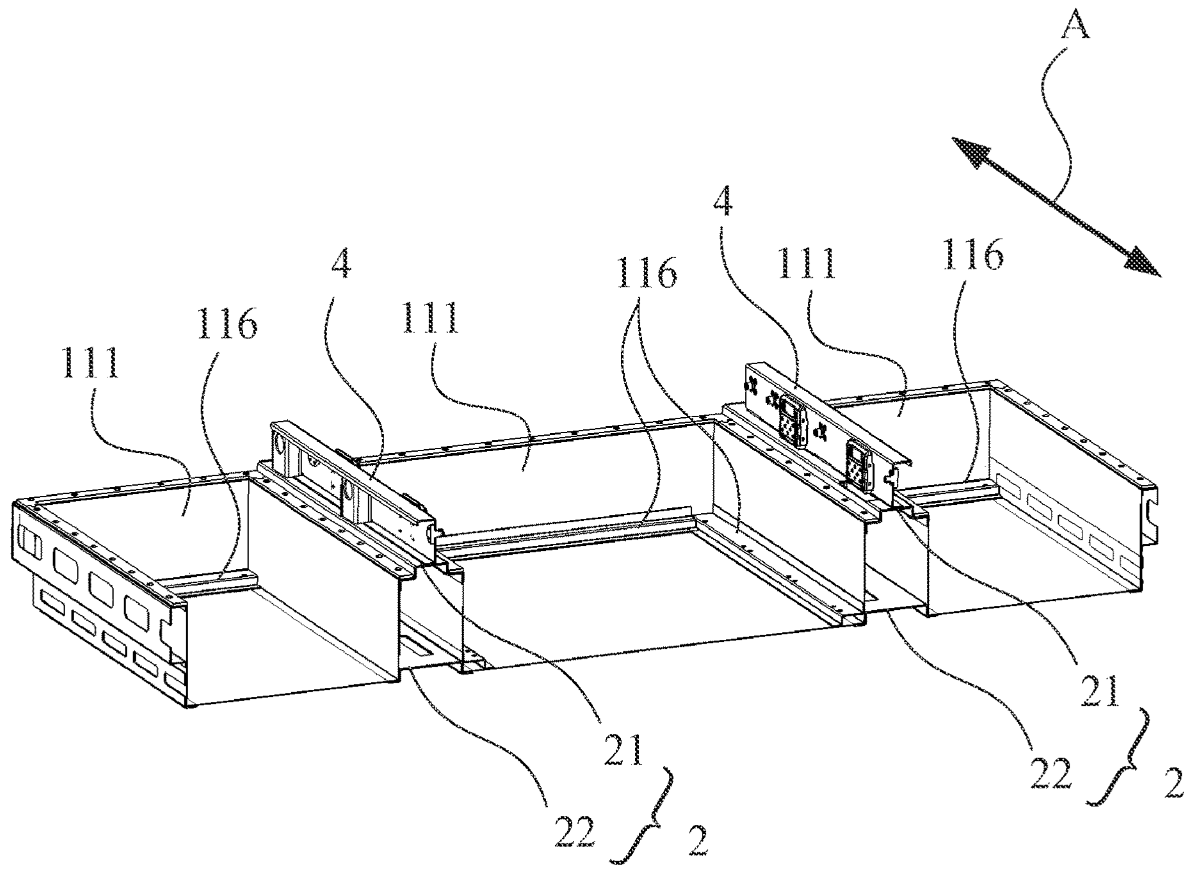
FIG. 9 is a cross-sectional view (1) of the battery pack according to Embodiment 1 of the present disclosure.
Figure 10:
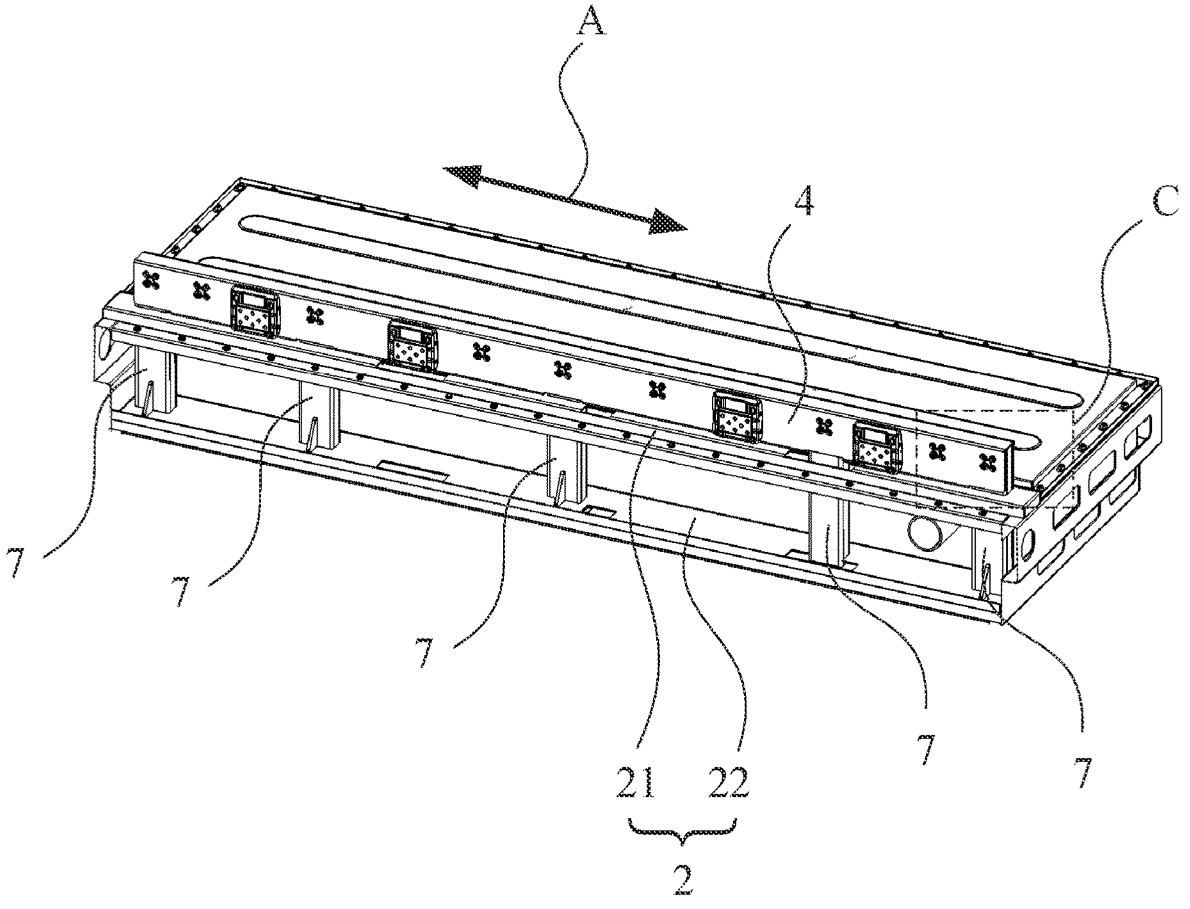
FIG. 10 is a cross-sectional view (2) of the battery pack according to Embodiment 1 of the present disclosure.

As shown in FIG. 9, the battery pack 10 also includes the reinforcement beam 7, which is used for realizing a reinforced connection relative to the mounting plate 4 and the gap connection structure 2. The setting position of the reinforcement beam 7 in the battery pack 10 is shown in FIG. 10. An upper end of the reinforcement beam 7 extends above the box 1 and is connected to the mounting plate 4, and a lower end of the reinforcement beam 7 passes through the upper plate 21 and the lower plate 22 of the gap connection structure 2 in turn, and is welded with the upper plate 21 and the lower plate 22 respectively. By arranging the reinforcement beam 7 to connect the mounting plate 4 and the gap connection structure 2, the acting force of the locking shaft 3 during locking is transmitted to the box units on both sides through the mounting plate, the reinforcement beam and the gap connection structure 2 in turn, so that the force is further dispersed and stress concentration is avoided.

Figure 11:
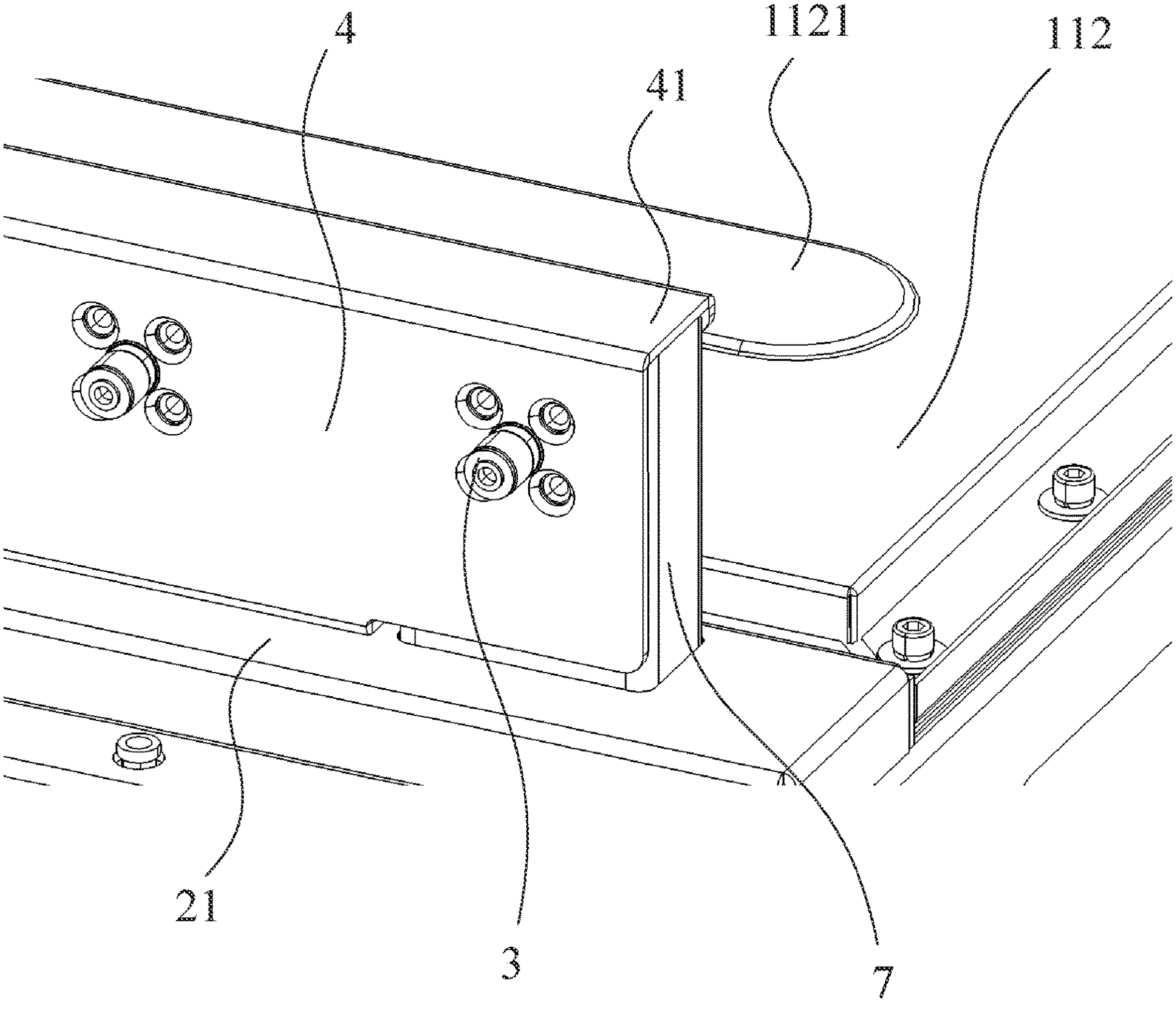
FIG. 11 is a partially enlarged view of part C in FIG. 10.
Figure 12:
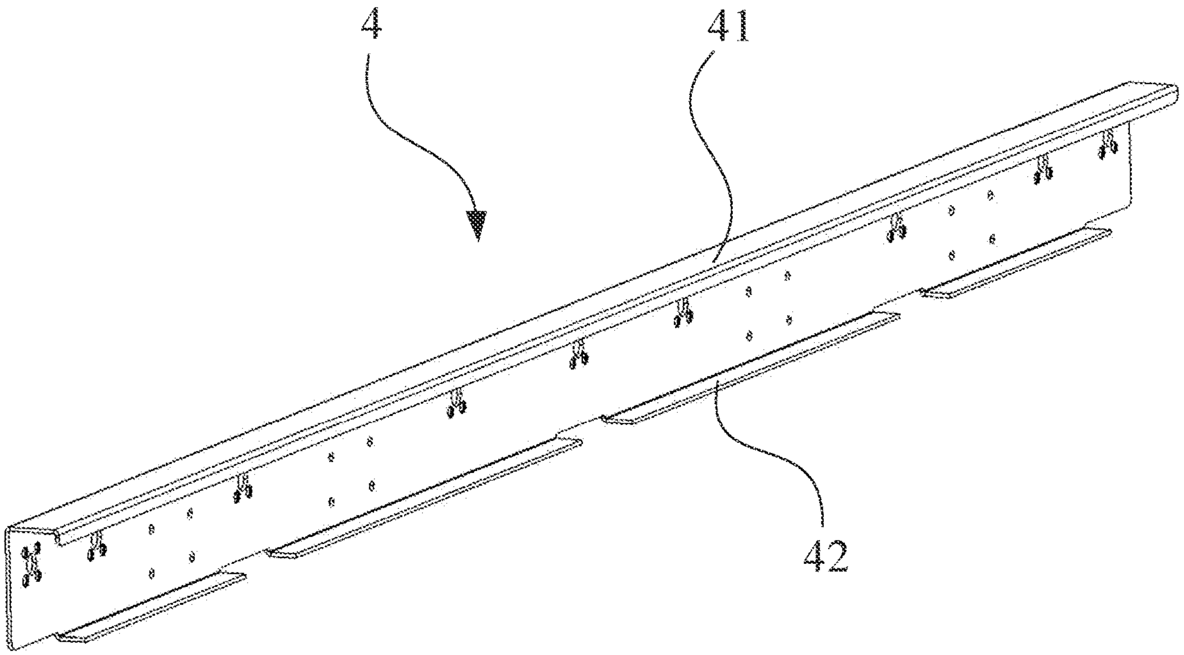
FIG. 12 is a schematic structural view of a mounting plate according to Embodiment 1 of the present disclosure.

As shown in FIGS. 11 and 12, there is a first extending portion 41 on the upper end of the mounting plate 4, and the first extending portion 41 wraps the upper end of the reinforcement beam 7, and a second extending portion 42 extending along the horizontal direction is provided on the lower end of the mounting plate 4, and the second extending portion 42 is abutting against the upper plate 21. By connecting the upper and lower ends of the mounting plate 4 to the reinforcement beam 7 and the upper plate 21 of the gap connection structure 2, the connection stability of the mounting plate 4 itself is improved.

As shown in FIG. 10, there are five reinforcement beams 7 located in the gaps, and these reinforcement beams 7 are evenly arranged along the longitudinal direction A of the vehicle body longitudinal beam, and are respectively connected with the mounting plate 4 and the gap connection structure 2 to strengthen the connection strength between the mounting plate and the adjacent box unit 11.

In other specific embodiments, the plurality of reinforcement beams 7 may not be evenly arranged along the longitudinal direction A of the vehicle body longitudinal beam, or may be arranged according to the actual situation, which will not be described here again.

Figure 13:
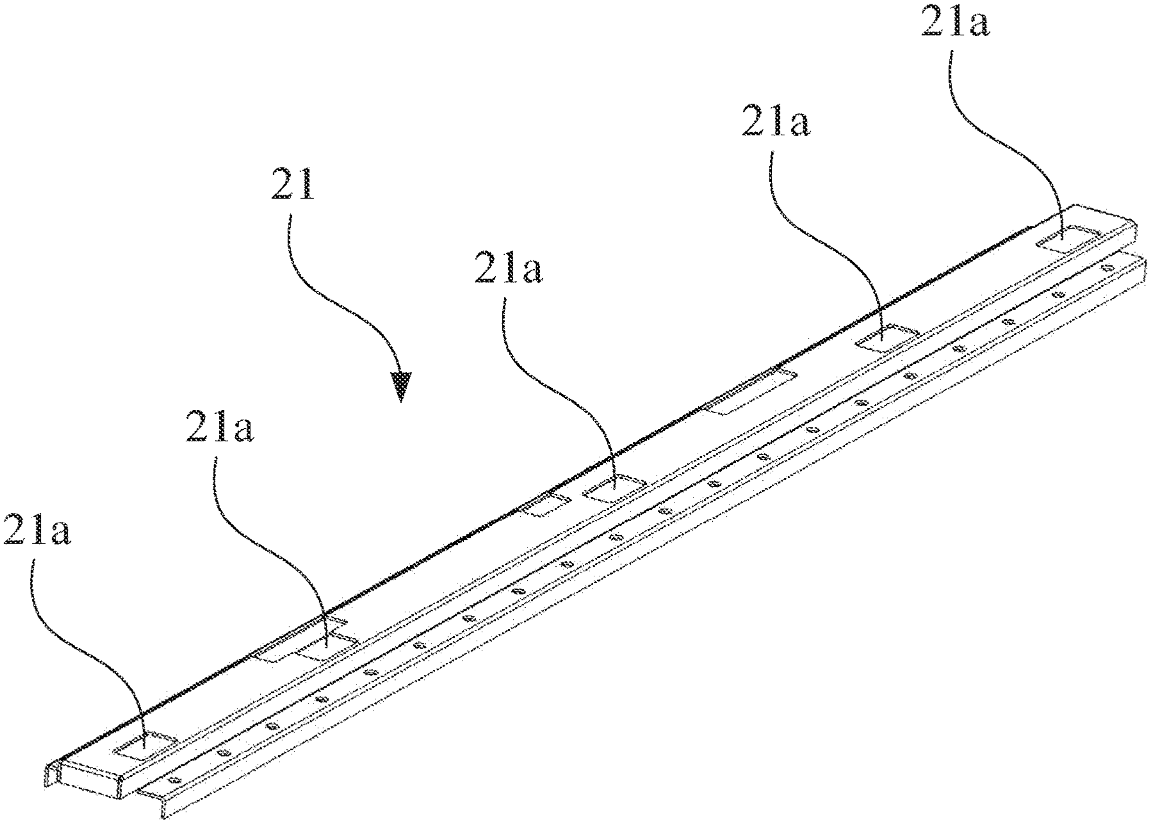
FIG. 13 is a schematic structural view of an upper plate according to Embodiment 1 of the present disclosure.

As shown in FIG. 13, five through mounting holes **21*a* are provided on the surface of the upper plate 21 for the reinforcement beam 7 to pass through and abut against the side walls of the reinforcement beam 7** to achieve positioning.

Figure 14:
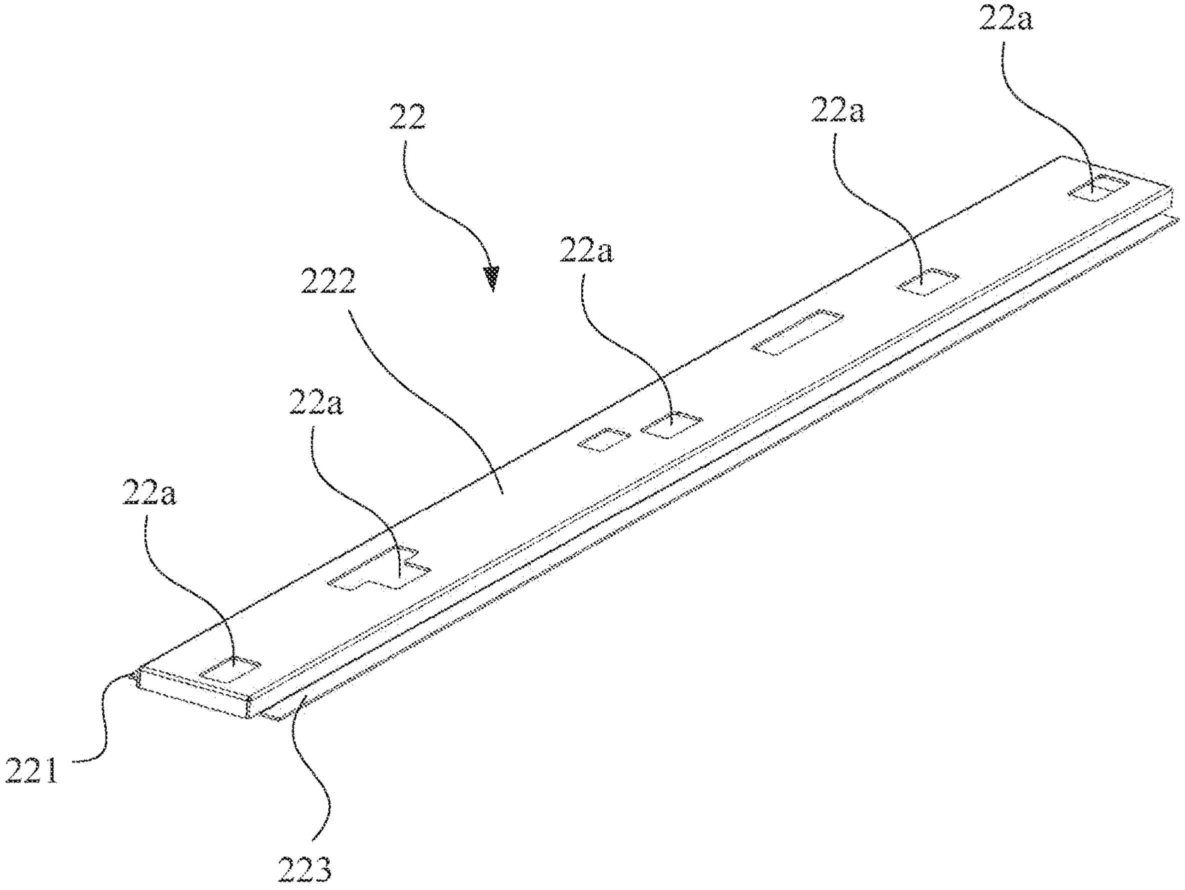
FIG. 14 is a schematic structural view of a lower plate according to Embodiment 1 of the present disclosure.

As shown in FIG. 14, the lower plate 22 includes a first side plate 221, a top plate 222 and a second side plate 223 connected in sequence, wherein the first side plate 221, the top plate 222 and the second side plate 223 are all straight plates and form an U-shaped structure with a downward opening. The lower plate 22 is connected to the box body 111 of the box unit 11 on the corresponding side through the first side plate 221 and the second side plate 223, and the lower end of the reinforcement beam 7 is penetrated through five mounting holes **22*a* on the top plate 222** to realize the positioning connection between the two.

Figure 15:
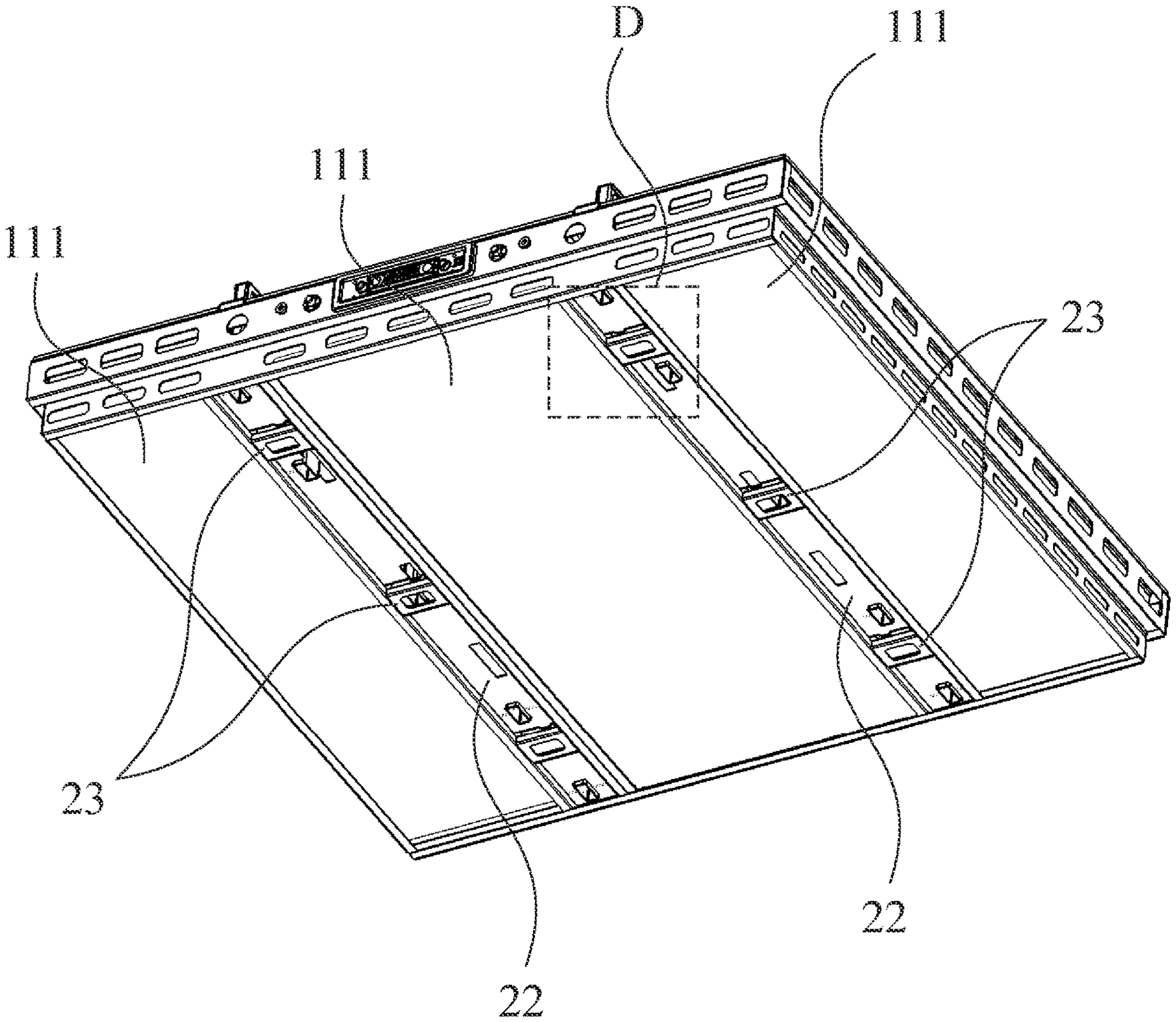
FIG. 15 is a schematic structural view of a bottom of the battery pack according to Embodiment 1 of the present disclosure.
Figure 16:
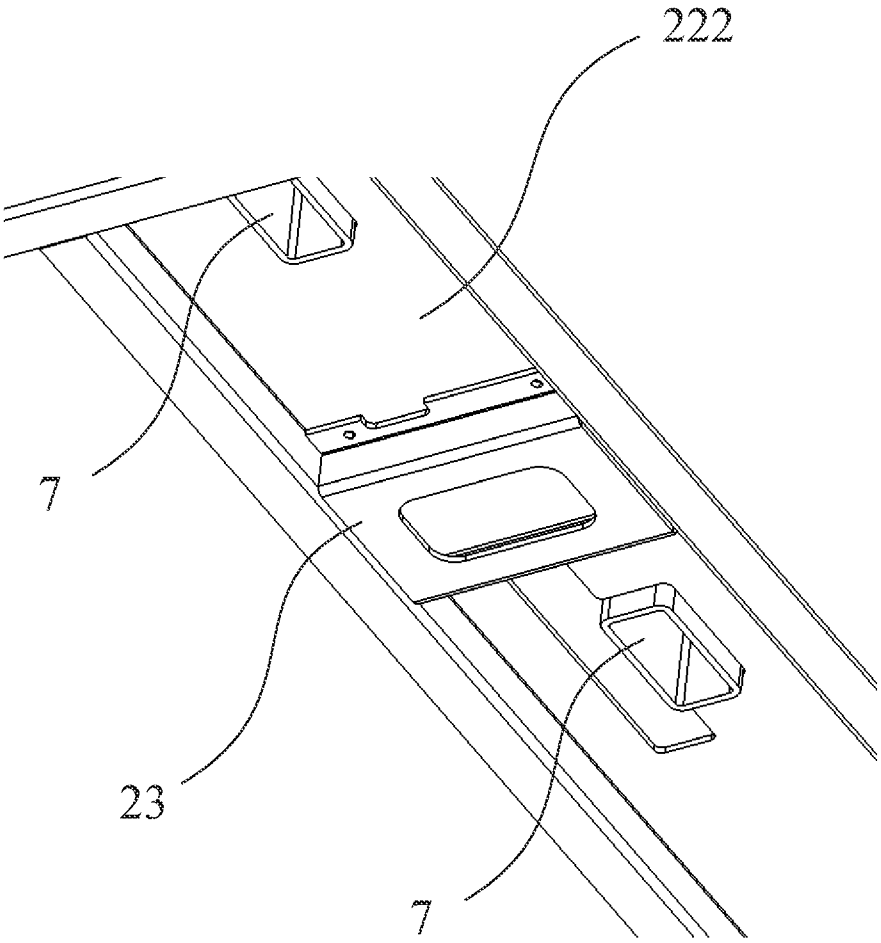
FIG. 16 is a partially enlarged view of part D in FIG. 15.

As can be seen from FIGS. 15 and 16, vertical ribs 23 are provided on the lower end surface of the top plate 222 to strengthen the strength of the lower plate 22 at the top plate 222.

In addition, a guide block 5 is provided on an end surface **4*a* (that is, the end surface on the side where the locking shaft 3 is provided) on a side of the mounting plate 4 close to the vehicle body longitudinal beam 20, and the guide block 5 is connected with the end surface 4*a* of the mounting plate 4 in an elastic manner. The surface of the guide block 5 facing away from the end surface 4*a* is a clamping surface 51, which is used for abutting against the side surface of the vehicle body bracket 30 to realize positioning along the width direction B of the vehicle body longitudinal beam. By providing the guide block 5, after the battery pack for the electric vehicle is mounted on the vehicle body bracket 30, the positioning ability of the battery pack for the electric vehicle relative to the vehicle body bracket 30 of the electric vehicle 100 can be improved, and shaking can be avoided when the battery pack for the electric vehicle is locked on the electric vehicle 100**.

As shown in FIG. 4, on a side of the guide block 5 away from the end surface **4*a* of the mounting plate 4, a guide surface 52 is provided obliquely above the clamping surface 51. The guide surface 52 is from bottom to top along the height direction of the battery pack 10, and the guide surface 52 is gradually approached to the mounting plate 4, so that the guiding and positioning of the vehicle body longitudinal beam 20 and the vehicle body bracket 30 in the horizontal direction is realized by means of the guide surface 52**.

It can be seen from FIG. 4 that the locking shafts 3 and the guide block 5 installed on the mounting plate 4 are arranged at intervals along the horizontal direction, and the guide block 5 can avoid interference with the locking mechanism 40 through the interval arrangement.

In addition, as shown in FIG. 5 and FIG. 6, the box 1 also includes a side reinforcement structure 115, which surrounds the outside of the entire box 1 and is respectively connected with outer surfaces of each box body 111 by welding. By providing the side reinforcement structure 115, the connection between each box body 111 is further strengthened and the structural integrity of the box 1 is better. At the same time, since the side reinforcement structure 115 is only used for reinforcement and does not have the function of holding the battery module 60, the surface of the side reinforcement structure 115 may be provided with a weight-reducing hole to reduce the weight of the side reinforcement structure 115, thereby achieving the purposes of weight reduction and light weight.

The battery pack 10 further includes a second electrical connector 6 provided at the side of the box 1. The second electrical connector 6 is electrically connected to a first electrical connector 50 of the vehicle body bracket 30. In this embodiment, the second electrical connector 6 is arranged on the side reinforcement structure 115 at a position corresponding to the first electrical connector 50, and is electrically connected with the battery modules in each box unit 11.

Figure 8:
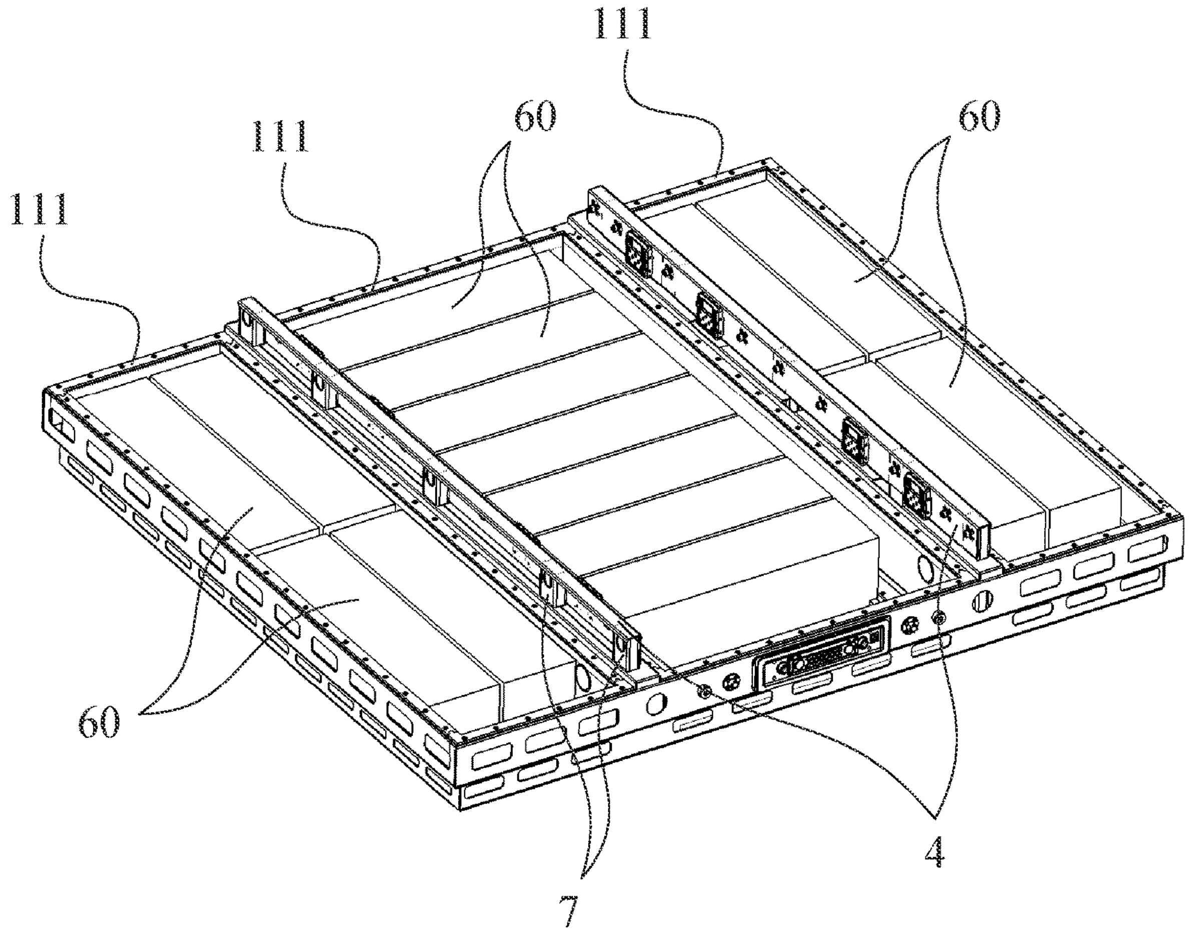
FIG. 8 is a schematic view of arrangement positions of battery modules of the battery pack according to Embodiment 1 of the present disclosure.

In addition, as shown in FIG. 5, bottom reinforcement structures 116 are also provided in the battery cell accommodating grooves 1111 of each box unit 11, and these bottom reinforcement structures 116 are fixed on an inner bottom surface of the box body 111, and the bottom reinforcement structure 116 is arranged close to the inner wall of the box body 111, and its two ends are respectively fixed on the inner wall of the box body 111. The bottom reinforcement structure 116 can strengthen the bottom strength of the box body 111 and prevent the bottom of the box body 111 from being deformed due to carrying the weight of the battery module 60. The distribution positions of the bottom reinforcement structures 116 in the battery cell accommodating groove 1111 are shown in FIG. 5, and these bottom reinforcement structures 116 are arranged in the box body 111 in parallel at intervals. As shown in FIG. 8, each battery module 60 arranged in the battery cell accommodating groove 1111 is simultaneously carried and fixed on these bottom reinforcing structures 116, so that the bottom of the box body 111 carries the battery modules 60 through these bottom reinforcement structure 116, so that the weight of the battery modules 60 can be dispersed in the box body 111 and the force is uniform.

As shown in FIG. 5, a cable duct 114 is also included in the box 1, and the cable duct 114 is arranged at a gap formed between two adjacent box units 11 and is arranged at one side close to the second electrical connector 6, and penetrates through the side walls of the box bodies 111 of the two box units 11 in the horizontal direction, so that the battery cell accommodating grooves 1111 of the box units 11 can connect with each other through the cable duct 114. Through this structural arrangement, cables of the battery modules 60 in different box units 11 can be collected in the same box unit 11 through the cable duct 114, which is convenient for cable wiring.

Figure 7:
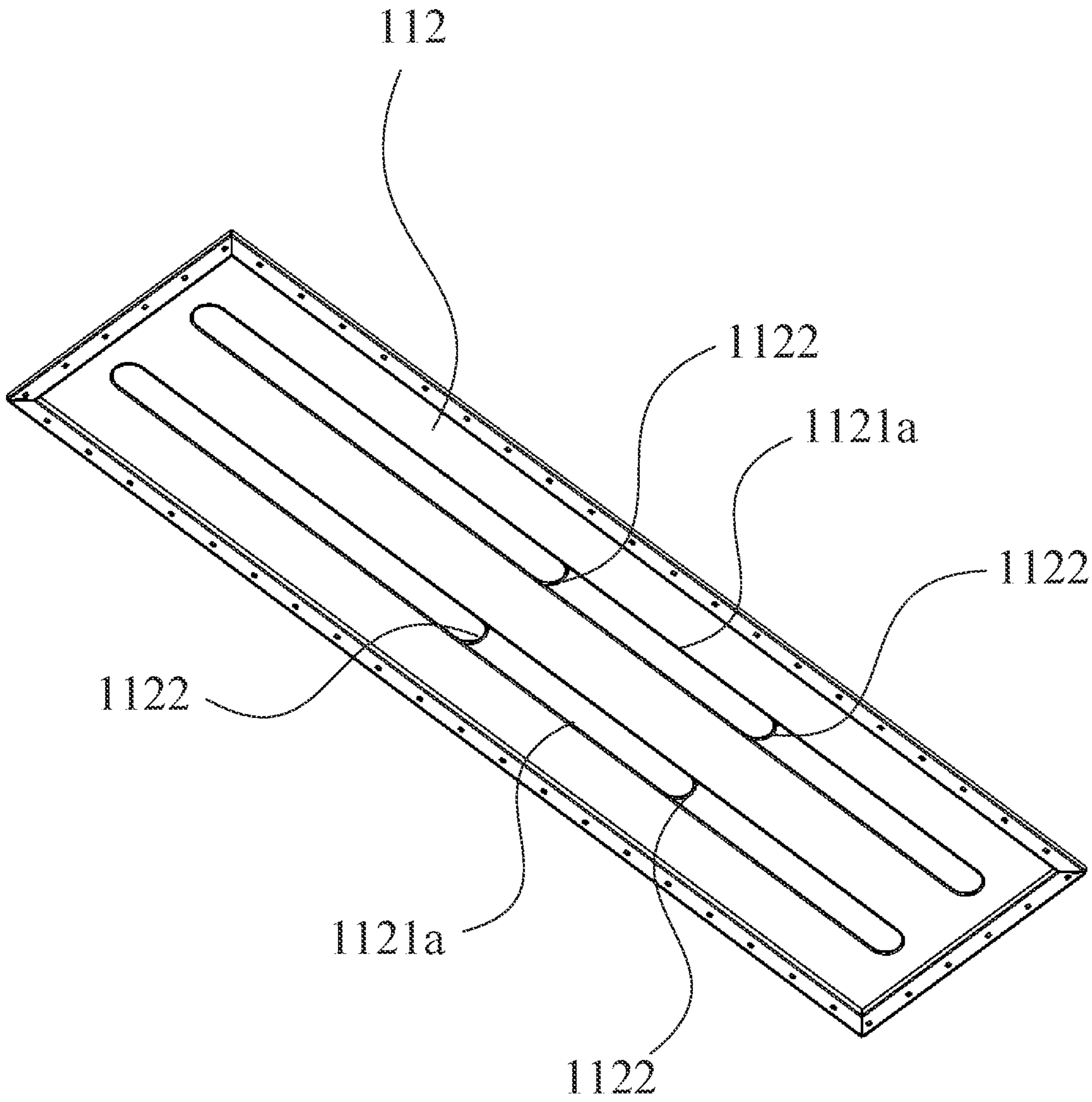
FIG. 7 is a schematic structural view of the box cover plate according to Embodiment 1 of the present disclosure.

Further, as shown in FIG. 7, in order to strengthen the structural strength of the box cover plate 112 and avoid deformation when installed on the box body 111, resulting in poor sealing performance, a reinforcement structure is also provided on the surface of the box cover plate 112. Specifically, the reinforcement structure includes a protruding portion 1121 (see FIG. 5) protruding from the box cover plate 112 toward a direction away from the box body 111 and a reinforcement rib 1122. The protruding portion 1121 forms a reinforcement groove 1121*a* with an opening facing toward the box body 111, and the reinforcement rib 1122 is set in the reinforcement groove. In this embodiment, the reinforcement rib 1122 is a strip structure with an arc-shaped cross section, thereby improving the structural strength of the box cover plate 112 and avoiding depression deformation during long-term use.

As shown in FIG. 3, the reinforcement groove 1121*a* on the surface of the box cover plate 112 in this embodiment extends along the longitudinal direction A of the vehicle body longitudinal beam, and a plurality of reinforcement ribs 1122 are arranged in a single reinforcement groove 1121*a*, and these reinforcement ribs 1122 are also distributed in the reinforcement groove 1121*a* along the longitudinal direction A of the vehicle body longitudinal beam.

Embodiment 2

Figure 17:
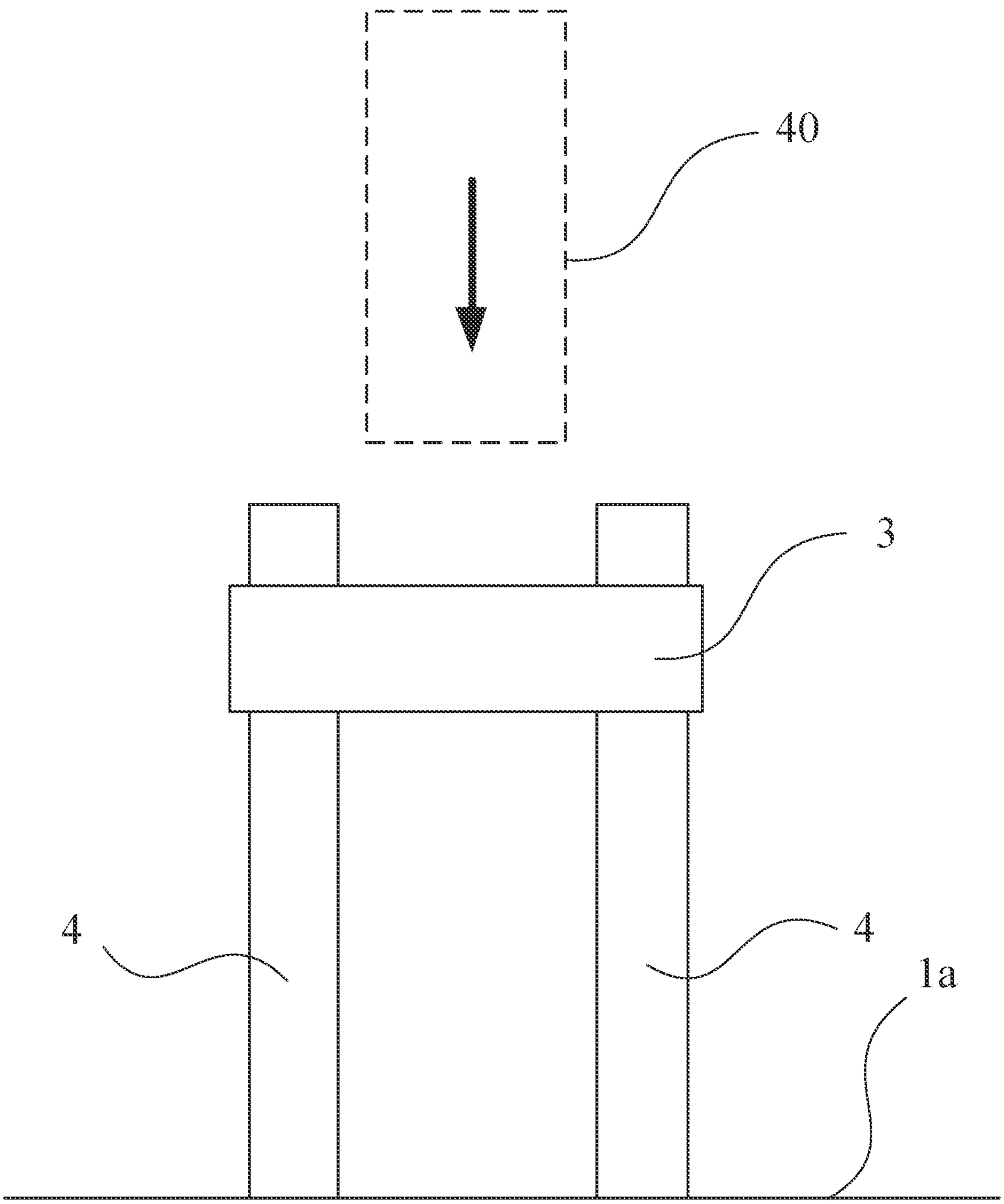
FIG. 17 is a schematic view of connection direction between the locking shaft and the locking mechanism according to Embodiment 2 of the present disclosure.

This embodiment also provides a battery pack 10, the structure of which is roughly the same as that of the battery pack 10 provided in Embodiment 1. The difference is that, as shown in FIG. 17, in this embodiment, there are two mounting plates 4 set corresponding to the same group of locking shafts 3, both of which are arranged above the corresponding gaps, the two mounting plates 4 are set parallel to each other, and two ends of the locking shaft 3 are respectively connected to the mounting plates 4.

The locking mechanism 40 has an inverted L-shaped through groove that runs through horizontally, so that the locking mechanism 40 enters the area between the two mounting plates 4 along the direction from top to bottom, so that the locking shaft 3 is locked in the through groove of the locking mechanism 40 to realize locking, and this structural arrangement can make the connection between the locking shaft 3 and the locking mechanism 40 more firm and stable.

In other specific embodiments, the locking mechanism 40 can be directly arranged on a side surface of the vehicle body longitudinal beam 20 instead of the vehicle body bracket 30. When the battery pack is connected to the vehicle body longitudinal beam 20, the battery pack is located below the vehicle body longitudinal beam 20, and the height of the connection point between the locking mechanism and the locking shaft is higher than the lower end of the vehicle body longitudinal beam 20, and the clamping surface 51 of the guide block 5 is used for clamping the side surface of the vehicle body longitudinal beam, which will not be described here.

In other specific methods, the locking cooperation between the locking mechanism and the locking shaft may also be replaced by a T-shaped locking method or a threaded locking method. The two methods are briefly introduced below.

The First Type: T-Shaped Locking Method

The locking mechanism includes a locking seat, the locking seat has a first opening hole extending in the vertical direction. A first threaded portion is provided in the first opening hole, and the first threaded portion is an internal thread. A locking cooperation mechanism includes a mounting seat and an unlocking lever, a second opening hole extending vertically is provided in the mounting seat, and the unlocking lever is vertically arranged in the second opening hole. The unlocking lever can move in the vertical direction relative to the mounting seat and the unlocking lever is provided with a second threaded portion matched with the first threaded portion, and the second threaded portion can engage with the first threaded portion, so as to realize the locking and unlocking of the locking mechanism and the locking cooperation mechanism.

The Second Type: Thread Locking Method

The locking mechanism includes a locking seat, and the locking seat has a first opening hole extending in the vertical direction. A limiting portion is provided in the first opening hole, the first opening hole is a square hole and the limiting portion is formed above the first opening hole. The locking cooperation mechanism includes an unlocking lever, an upper end of the unlocking lever is provided with a stopper portion, and the stopper portion includes a locking lever extending in the horizontal direction. The locking lever is a cylinder and is horizontally arranged on the top of the unlocking lever. The locking lever and the unlocking lever together form a T-shaped structure.

When the locking lever is at a first angle, the locking lever can pass through the first opening hole and enter the limiting portion of the locking seat, and when the locking lever rotates to a second angle, the locking lever can be limited in the limiting portion, so that the locking mechanism and the locking cooperation mechanism are relatively fixed.

In the above embodiment, the height space below the vehicle body longitudinal beam 20 is fully utilized, and when the battery pack 10 is disassembled by the battery swapping device, the unloaded battery swapping device can directly enter the space below the battery pack 10 without interfering with the bottom of the electric vehicle 100; when the battery pack 10 is installed by the battery swapping device, the battery swapping device carrying the battery pack 10 can also directly enter the lower part of the vehicle body longitudinal beam 20 for battery swapping without interfering with the bottom of the electric vehicle 100. During the whole process, there is no need to lift the vehicle body, and it is not necessary to set up a sunken space or dig a pit for the entry and exit of battery swapping device, which reduces the cost, time and difficulty of building a battery swapping station, reduces the requirements for a site for building the station, and improves the efficiency of battery swapping.

Although the specific implementation of the present disclosure has been described above, those skilled in the art should understand that this is only an example, and the protection scope of the present disclosure is defined by the appended claims. Those skilled in the art can make various changes or modifications to these embodiments without departing from the principle and essence of the present disclosure, but these changes and modifications all fall within the protection scope of the present disclosure.

What is claimed is:

1. A battery pack for an electric vehicle, which is installed on a vehicle body longitudinal beam of the electric vehicle, wherein the battery pack for the electric vehicle comprises:

a box, the box comprising at least two box units, and the box unit being provided with a battery module for external charging and discharging;

a locking shaft arranged horizontally, the locking shaft being provided on upper part between two adjacent box units and corresponding to the location of a locking mechanism on the vehicle body longitudinal beam;

a mounting plate is provided on the box, and one end of the locking shaft is connected to the mounting plate;

there is a gap between the adjacent box units, and the box further comprises:

a gap connection structure, the adjacent box units being connected by the gap connection structure, and the gap connection structure being respectively connected to the box bodies of the adjacent box units;

the mounting plate is disposed on the gap connection structure.

2. The battery pack for the electric vehicle according to claim 1, wherein both ends of the locking shaft are connected to another mounting plate and the mounting plate respectively.

3. The battery pack for the electric vehicle according to claim 1, wherein the mounting plate is at least partially provided between two adjacent box units.

4. The battery pack for the electric vehicle according to claim 3, wherein the mounting plate extends along a longitudinal direction of the vehicle body longitudinal beam;

there are a plurality of locking shafts, and the plurality of locking shafts are sequentially distributed on an end surface of the mounting plate close to the locking mechanism along the longitudinal direction of the vehicle body longitudinal beam.

5. The battery pack for the electric vehicle according to claim 4, wherein the battery pack for the electric vehicle further comprises a guide block, the guide block is elastically arranged on an end surface of the mounting plate close to the vehicle body longitudinal beam, and the guide block has a clamping surface for abutting against a side surface of the vehicle body longitudinal beam.

6. The battery pack for the electric vehicle according to claim 5, wherein one end of the guide block away from the box is obliquely provided with a guide surface, and the guide surface gradually approaches the mounting plate from bottom to top along a height direction of the battery pack for the electric vehicle;

and/or, the locking shaft and the guide block are arranged on the mounting plate at intervals along a horizontal direction.

7. The battery pack for the electric vehicle according to claim 4, wherein each of the box units comprises:

a box body, the box body being provided with a battery cell accommodating groove for placing a battery module;

a box cover plate, the box cover plate being detachably connected to a notch of the battery cell accommodating groove of the box body and closing the notch.

8. The battery pack for the electric vehicle according to claim 7, wherein the battery pack for the electric vehicle further comprises a reinforcement beam, a first end of the reinforcement beam extends above the box and is connected to the mounting plate, and a second end of the reinforcement beam is connected to the gap connection structure.

9. The battery pack for the electric vehicle according to claim 8, wherein the gap connection structure comprises an upper plate and a lower plate, two ends of the lower plate are respectively connected to bottoms of the box bodies of the adjacent box units, and two ends of the upper plate are respectively connected to tops of the box bodies of the adjacent box units;

the second end of the reinforcement beam passes through the upper plate and is connected to the lower plate;

and/or, there are a plurality of reinforcement beams, and the plurality of reinforcement beams are arranged along the longitudinal direction of the longitudinal beam of the vehicle body.

10. The battery pack for the electric vehicle according to claim 9, wherein an upper end of the mounting plate is provided with a first extending portion, and the first extending portion wraps the first end of the reinforcement beam;

and/or, a lower end of the mounting plate is provided with a second extending portion, and the second extending portion abuts against the upper plate.

11. The battery pack for the electric vehicle according to claim 9, wherein the lower plate comprises a first side plate, a top plate and a second side plate which are sequentially connected, the lower plate is connected with the box body of the box unit on a corresponding side through the first side plate and the second side plate, and the second end of the reinforcement beam is connected with the top plate;

an end surface of the top plate is provided with a vertical rib.

12. The battery pack for the electric vehicle according to claim 7, wherein the box unit further comprises a sealing member, and the sealing member is annularly arranged at the notch of the battery cell accommodating groove and sandwiched between the box body and the box cover plate.

13. The battery pack for the electric vehicle according to claim 7, wherein a surface of the box cover plate has a reinforcement structure.

14. The battery pack for the electric vehicle according to claim 13, wherein the reinforcement structure comprises a protruding portion of the box cover plate protruding in a direction away from the box body and a reinforcement rib, and the protruding portion forms a reinforcement groove with an opening facing the direction of the box body, and the reinforcement rib is arranged in the reinforcement groove;

the reinforcement groove extends along the longitudinal direction of the vehicle body longitudinal beam;

there are a plurality of reinforcement ribs, and the plurality of reinforcement ribs are arranged in the reinforcement groove along the longitudinal direction of the vehicle body longitudinal beam.

15. The battery pack for the electric vehicle according to claim 7, wherein the battery pack for the electric vehicle further comprises a second electrical connector for docking with a first electrical connector on the vehicle body longitudinal beam, the second electrical connector is arranged at a position of the box corresponding to the first electrical connector, and the second electrical connector is electrically connected with the battery module;

wherein the box further comprises:

a cable duct, through which the battery cell accommodating grooves of the adjacent box units are connected;

the cable duct is provided close to the second electrical connector.

16. The battery pack for the electric vehicle according to claim 7, wherein the battery pack for the electric vehicle further comprises a side reinforcement structure, the side reinforcement structure is arranged around the outside of the box, and the side reinforcement structure is respectively connected to an outer surface of each box body.

17. The battery pack for the electric vehicle according to claim 7, wherein the battery pack for the electric vehicle also comprises a bottom reinforcement structure, the bottom reinforcement structure is fixed on an inner bottom surface of the box body, two ends of the bottom reinforcement structure extend to an inner wall of the box body respectively.

18. The battery pack for the electric vehicle according to claim 17, wherein there are a plurality of bottom reinforcement structures, and the plurality of bottom reinforcement structures are arranged in the box body in parallel at intervals, and the battery module is carried and arranged on the plurality of bottom reinforcement structures simultaneously; and/or, there are a plurality of the locking shafts which are divided into two groups along a width direction of the vehicle body longitudinal beam, and the two groups of the locking shafts are symmetrically distributed on the box, and the box comprises three box units, the three box units are distributed at intervals, and two of the three box units are located outside the two groups of symmetrically arranged locking shafts, and the other box unit is arranged between the two groups of symmetrically arranged locking shafts.

19. An electric vehicle, comprising the longitudinal beam of the vehicle body and the battery pack for the electric vehicle according to claim 1, wherein the locking mechanism is arranged on the vehicle body longitudinal beam, and the battery pack for the electric vehicle is detachably connected to the vehicle body longitudinal beam through a cooperation of the locking shaft and the locking mechanism.

20. The electric vehicle according to claim 19, wherein the electric vehicle further comprises a vehicle body bracket, the locking mechanism is provided on the vehicle body bracket, and the vehicle body bracket is provided on the vehicle body longitudinal beam;

wherein a height of a connection point between the locking mechanism and the locking shaft is higher than a height of a lower end of the vehicle body bracket or the longitudinal beam of the vehicle body;

and/or, the battery pack for the electric vehicle has a plurality of the locking shafts, the locking shafts are symmetrically distributed on the box, and free ends of the locking shafts are oppositely arranged, and the locking mechanism is arranged on a back side of the vehicle body bracket; or, the battery pack for the electric vehicle has a plurality of the locking shafts, the locking shafts are symmetrically distributed on the box, and the free ends of the locking shafts are arranged back to back, and the locking mechanism is arranged on an opposite side of the vehicle body bracket.

* * * * *